United States Patent
Jang et al.

(10) Patent No.: US 11,163,398 B2
(45) Date of Patent: Nov. 2, 2021

(54) TOUCH DISPLAY DEVICE AND TOUCH DRIVING METHOD THEREOF

(71) Applicant: LG DISPLAY CO., LTD., Seoul (KR)

(72) Inventors: HyunWoo Jang, Gyeonggi-do (KR); JuneGun Chung, Gyeonggi-do (KR); Youngwoo Jo, Gyeonggi-do (KR); HongJu Lee, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/113,781

(22) Filed: Dec. 7, 2020

(65) Prior Publication Data

US 2021/0200413 A1    Jul. 1, 2021

(30) Foreign Application Priority Data

Dec. 26, 2019    (KR) .......................... 10-2019-0174870

(51) Int. Cl.
  *G06F 3/041*    (2006.01)
  *G06F 3/044*    (2006.01)
(52) U.S. Cl.
  CPC .......... *G06F 3/04166* (2019.05); *G06F 3/044* (2013.01)

(58) Field of Classification Search
  CPC .............. G06F 3/0416; G06F 3/04166; G06F 3/041661; G06F 3/044; G06F 3/0443; G06F 3/0446
  See application file for complete search history.

(56) References Cited

U.S. PATENT DOCUMENTS

| | | | |
|---|---|---|---|
| 10,754,481 B2* | 8/2020 | Teranishi | G06F 3/041661 |
| 2017/0351364 A1* | 12/2017 | Kim | G06K 9/001 |
| 2018/0246596 A1* | 8/2018 | Takada | G06F 3/04164 |
| 2018/0348950 A1* | 12/2018 | Nakanishi | G06F 3/0445 |
| 2019/0146610 A1* | 5/2019 | Teranishi | G02F 1/13338 345/173 |
| 2020/0356197 A1* | 11/2020 | Teranishi | G06F 3/0443 |

* cited by examiner

*Primary Examiner* — Michael Pervan
(74) *Attorney, Agent, or Firm* — Birch, Stewart, Kolasch & Birch, LLP

(57) ABSTRACT

Provided are a touch display device and a touch driving method thereof. Touch electrodes are grouped into a touch sensing block and non-touch blocks. The touch electrodes in the touch sensing block and the touch electrodes in the non-touch blocks are sensed at different sensing ratios. Power consumption is efficiently managed and sensitivity in touch sensing is maintained.

11 Claims, 23 Drawing Sheets

TOUCH DISPLAY DEVICE AND TOUCH DRIVING METHOD THEREOF

CROSS REFERENCE TO RELATED APPLICATION

This application claims priority to the Korean Patent Application No. 10-2019-0174870, filed on Dec. 26, 2019 in the Republic of Korea, the entire contents of which are hereby expressly incorporated by reference for all purposes as if fully set forth herein into the present application.

BACKGROUND

Field

Embodiments of the present disclosure relate to a touch display device and a touch driving method thereof.

Description of Related Art

Along with the development of the information society, demand for a variety of types of image display devices is increasing. In this regard, a range of display devices, such as a liquid crystal display (LCD) device, a plasma display panel (PDP), and an organic light-emitting display (OLED) device, have recently come into widespread use.

Among such display devices, liquid crystal display devices display images by adjusting the transmittance of liquid crystal using an electric field. In this regard, liquid crystal display devices respectively include a liquid crystal display panel in which liquid crystal cells are arrayed in the shape of a matrix and a driver for driving the liquid crystal display panel.

In the pixel array of the liquid crystal display panel, a plurality of gate lines intersect a plurality of data lines, and thin-film transistors (TFTs) for driving the liquid crystal cells are provided at the intersections of the gate lines and the data lines. In addition, the liquid crystal display panel is provided with storage capacitors for maintaining the voltages of the liquid crystal cells. Each of the liquid crystal cells includes a pixel electrode, a common electrode, and a liquid crystal layer. A data voltage applied to the pixel electrode and a common voltage applied to the common electrode generate an electric field in the liquid crystal layer of the liquid crystal cells. Here, the intensity of light passing through the liquid crystal cells is adjusted by the electric field, thereby creating an image.

A driving circuit includes a gate driving circuit sequentially supplying a gate output signal to the gate lines and a data driving circuit supplying an image signal (i.e., a data voltage) to the data lines. The data driving circuit supplies the data voltage to the liquid crystal cells by driving the data lines. The gate driving circuit selects the liquid crystal cells of the display panel, to which the data voltage is to be applied, per horizontal line of liquid crystal cells by sequentially driving the gate lines.

The gate driving circuit includes a gate shift register comprised of a plurality of stages in order to sequentially generate gate signals. The respective stages of the shift register output the gate signals respectively comprised of a gate clock signal and a low-potential voltage level by alternately performing charging and discharging. The stages of the shift register are connected to the gate lines in one-to-one correspondence. A gate signal having a specific level is sequentially generated once per frame by the stages and is supplied to a specific gate line.

In addition, regarding display devices supplying a touch input function, in-cell touch display devices respectively including components of a touchscreen embedded in a display panel thereof have been developed and used in order to provide portable devices, such as a smartphone and a tablet computer, having a slim profile.

Such a touch display device determines a touch event (or determines whether or not a touch has occurred) and determines touch coordinates by detecting a plurality of capacitances generated between touch lines in a display panel in which touch electrodes are arrayed in the shape of a matrix.

Here, the process of determining a touch event and touch coordinates can be enabled by driving the entirety of the touch electrodes or alternately driving the touch electrodes during a touch sensing period.

Although the process of driving the entirety of the touch electrodes can improve sensitivity in the touch sensing, power consumption can be disadvantageously increased. In addition, although the process of alternately driving the touch electrodes can reduce power consumption, sensitivity in the touch sensing can be disadvantageously reduced.

BRIEF SUMMARY OF THE EMBODIMENTS

Various aspects of the present disclosure provide a touch display device and a touch driving method thereof able to reduce power consumption without reducing sensitivity in touch sensing.

Also provided are a touch display device and a touch driving method thereof able to group touch electrodes into a touch sensing block and non-touch blocks and sense the touch electrodes in the touch sensing block and the touch electrodes in the non-touch blocks at different sensing ratios, thereby efficiently managing the power consumption while maintaining sensitivity in the touch sensing.

Also provided are a touch display device and a touch driving method thereof able to sense the touch electrodes at different frequencies according to an active mode and an idle mode, thereby efficiently managing the power consumption while maintaining sensitivity in the touch sensing.

According to an aspect, embodiments can provide a touch display device including a display panel and a touch circuit. In the display panel, a touchscreen panel including a plurality of touch electrodes arranged in a matrix form can be embedded. The touch circuit can sense the plurality of touch electrodes by grouping the plurality of touch electrodes into a plurality of touch blocks and controlling a greater number of touch electrodes to be sensed in a touch sensing block in which a touch is detected, among the plurality of touch blocks, than in a non-touch block in which no touch is detected, among the plurality of touch blocks.

The touch circuit can apply a touch driving signal to the touch electrodes in the touch blocks and determines a touch event and a touch position using touch sensing signals received from the touch electrodes.

The touch circuit can be configured so that driving lines, through which the touch driving signal is applied, are the same as or separate from sensing lines, through which the touch sensing signals are received.

All of the touch electrodes in the touch sensing block can be continuously sensed.

The touch electrodes in the non-touch block can be sensed at a ½ period.

The touch electrodes in the non-touch block can be sensed so that odd touch electrodes and even touch electrodes are alternately sensed, an odd row of touch electrodes and an even row of touch electrodes are alternately sensed, or an odd column of touch electrodes and an even column of touch electrodes are alternately sensed.

The touch electrodes in the non-touch block can be sensed at a ¼ period so that four adjacent touch electrodes thereof are sequentially sensed.

The touch electrodes in the touch sensing block can be sensed at a ½ period, and the touch electrodes in the non-touch block can be sensed at a ¼ period so that four adjacent touch electrodes thereof are sequentially sensed.

The sensing can be controlled so that a greater number of the touch electrodes are sensed in the touch sensing block in an active mode of the display panel than in the touch sensing block in an idle mode of the display panel.

In the active mode, the number of first touch electrodes sensed in the touch sensing block, among the plurality of touch electrodes, can be different from the number of second touch electrodes sensed in the non-touch block, among the plurality of touch electrodes, the number of first touch electrodes being greater than the number of second touch electrodes.

According to an aspect, embodiments can provide a touch driving method for a display panel, wherein a touchscreen panel including a plurality of touch electrodes arranged in a matrix form is embedded in the display panel. The touch driving method can include: sensing the plurality of touch electrodes by grouping the plurality of touch electrodes into a plurality of touch blocks; determining a touch event in a touch block among the plurality of touch blocks; and if the touch event is present as a result of the determination, controlling the sensing so that a greater number of touch electrodes are sensed in a touch block in which a touch is detected, among the plurality of touch blocks, than in a touch block in which no touch is detected, among the plurality of touch blocks.

According to embodiments, the touch display device and the touch driving method thereof can reduce power consumption without reducing sensitivity in touch sensing.

In addition, according to embodiments, the touch display device and the touch driving method thereof can group touch electrodes into a touch sensing block and non-touch blocks and sense the touch electrodes in the touch sensing block and the touch electrodes in the non-touch blocks at different sensing ratios, thereby efficiently managing the power consumption while maintaining sensitivity in the touch sensing.

Furthermore, according to embodiments, the touch display device and the touch driving method thereof can sense the touch electrodes at different frequencies according to an active mode and an idle mode, thereby efficiently managing the power consumption while maintaining sensitivity in the touch sensing.

BRIEF DESCRIPTION OF DRAWINGS

The above and other objects, features, and advantages of the present disclosure will be more clearly understood from the following detailed description, taken in conjunction with the accompanying drawings, in which.

DETAILED DESCRIPTION OF THE EMBODIMENTS

Figure 1:
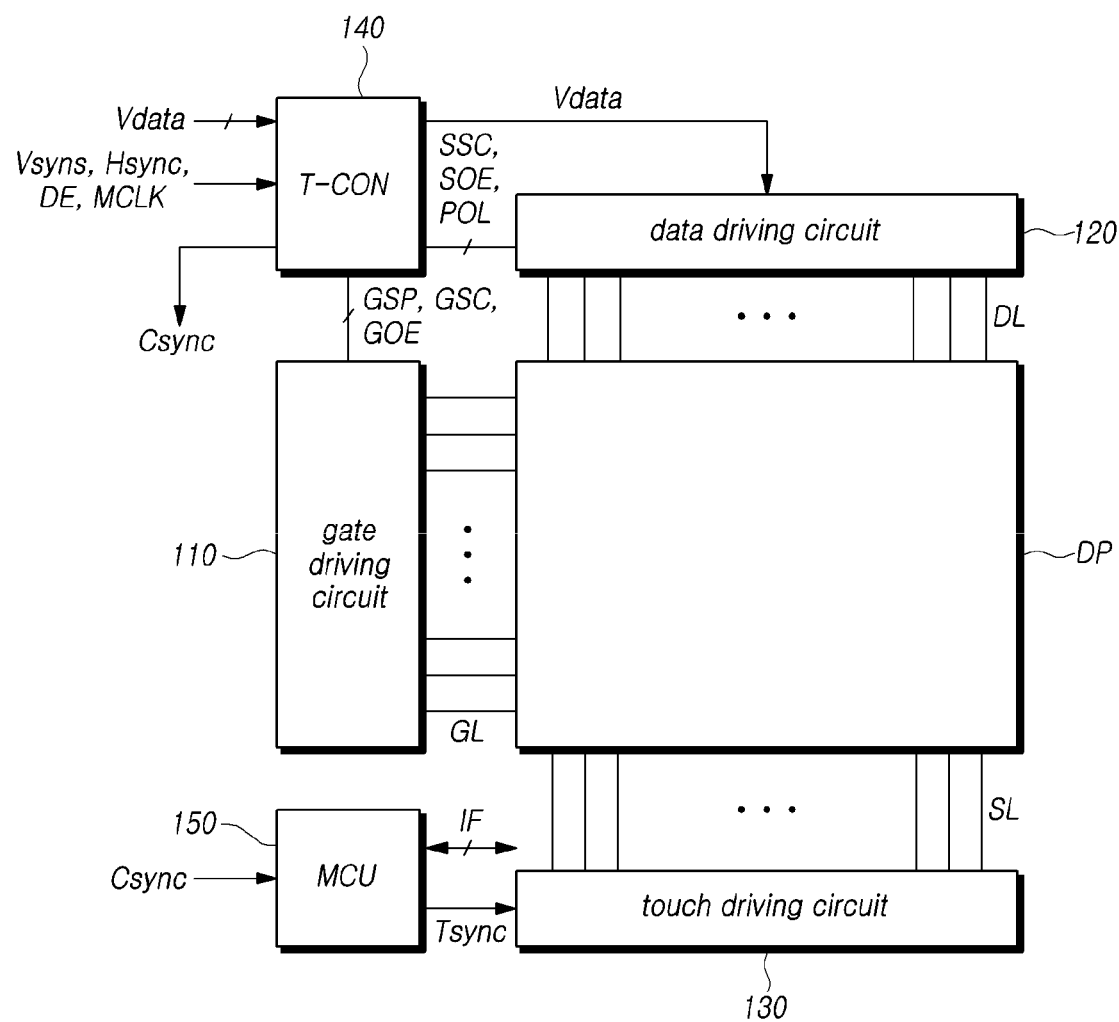
FIG. 1 is a block diagram illustrating a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description can make the subject matter in some embodiments of the present disclosure rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)", can be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element can be included in at least one of two or more elements that "are connected or coupled to", "contact or overlap", etc. each other.

When time relative terms, such as "after", "subsequent to", "next", "before", and the like, are used to describe processes or operations of elements or configurations, or flows or steps in operating, processing, manufacturing methods, these terms can be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impacts, noise, etc.) even when a relevant description is not specified.

In the drawings and in the description of the present application, N+Xth represents $(N+X)^{th}$. For example, in FIG. 20, "4Nth", "4N+1th", "4N+2th", "4N+3th" represent respectively "$(4N)^{th}$", "$(4N+1)^{th}$", "$(4N+2)^{th}$", "$(4N+3)^{th}$".

FIG. 1 is a block diagram illustrating a touch display device according to embodiments. All components of the touch display device according to all embodiments of the present disclosure are operatively coupled and configured.

Referring to FIG. 1, the touch display device according to embodiments can include a display panel DP, a gate driving circuit 110, a data driving circuit 120, a touch driving circuit 130, a timing controller (T-CON) 140, and a micro-control unit (MCU) 150.

In a case of liquid crystal display device, the display panel DP displays images on the basis of a scan signal SCAN transferred from the gate driving circuit 110 through gate lines GL and a data voltage Vdata transferred from the data driving circuit 120 through data lines DL. The display panel DP includes a liquid crystal layer situated between two substrates, and can operate in any known mode, such as a twisted nematic (TN) mode, a vertical alignment (VA) mode, an in-plane switching (IPS) mode, or a fringe field switching (FFS) mode.

In a case of organic light emitting display device, a plurality of subpixels SP of the display panel DP can be defined by a plurality of data lines DL and a plurality of gate lines GL. A subpixel SP can include a thin-film transistor (TFT), a pixel electrode, such as an organic light-emitting diode (OLED), to be supplied with the data voltage Vdata, a storage capacitor Cst electrically connected to the organic light-emitting diode (OLED) to maintain the voltage, and the like provided in an area in which a data line DL intersects a gate line GL.

A black matrix, a color filter, and the like, can be provided on the top substrate of the display panel DP, while thin-film transistors (TFTs), subpixels (SP), common electrodes (CEs), and the like, can be provided on the bottom substrate of the display panel DP. The display panel DP can be provided using a color-filter-on-TFT (COT) structure. In this case, the black matrix and the color filter can be provided on the bottom substrate of the display panel DP.

The common electrodes, to which a common voltage is supplied, can be provided on the top substrate or the bottom substrate of the display panel DP. Polarizers are attached to the top substrate and the bottom substrate of the display panel DP, and alignment layers for setting the tilt angles of liquid crystal molecules are provided on inner surfaces of the top and bottom substrates in contact with the liquid crystal layer.

Column spacers for maintaining the cell gaps of liquid crystal cells are provided between the top substrate and the bottom substrate of the display panel DP. A backlight unit is disposed below the bottom surface of the bottom polarizer of the display panel DP. The backlight unit can be implemented as an edge-lit backlight unit, a direct-lit backlight unit, or the like to illuminate the display panel DP.

Here, a touchscreen panel having an incell touch structure can be embedded in a pixel array region of the display panel DP. The incell touchscreen panel uses electrodes in the shape of blocks (or points), for example, provided inside the display panel DP, as touch electrodes.

The timing controller 140 controls the gate driving circuit 110 and the data driving circuit 120. The timing controller 140 receives timing signals, such as a vertical synchronization signal Vsync, a horizontal synchronization signal Hsync, a data enable signal DE, and a main clock signal MCLK, as well as the data voltage Vdata of an image signal, from a host system.

The timing controller 140 controls the gate driving circuit 110, on the basis of scan timing control signals, such as a gate start pulse signal GSP, a gate shift clock signal GSC, and a gate output enable signal GOE. In addition, the timing controller 140 controls the data driving circuit 120, on the basis of data timing control signals, such as a source sampling clock signal SSC, a polarity control signal POL, and a source output enable signal SOE.

The gate driving circuit 110 sequentially drives the plurality of gate lines GL by sequentially supplying the scan signal SCAN to the display panel DP through the plurality of gate lines GL. Herein, the gate driving circuit 110 can also be referred to as a scan driving circuit or a gate driver integrated circuit (GDIC).

The gate driving circuit 110 can include one or more GDICs, and can be located on or adjacent to one or both sides of the display panel DP depending on the driving method. Alternatively, the gate driving circuit 110 can be implemented using a gate-in-panel structure in which the gate driving circuit 110 is embedded in a bezel area of the display panel DP.

The gate driving circuit 110 sequentially supplies the scan signal SCAN having an on or off voltage to the plurality of gate lines GL, under the control of the timing controller 140. In this regard, the gate driving circuit 110 can include a shift register, a level shifter, and the like.

The data driving circuit 120 drives the plurality of data lines DL by supplying the data voltage Vdata, received from the timing controller 140, to the plurality of data lines DL. Herein, the data driving circuit 120 can also be referred to as a source driving circuit or a source driver integrated circuit (SDIC).

The data driving circuit 120 can include one or more SDICs. The SDICs can be connected to bonding pads of the display panel DP by a tape-automated bonding (TAB) method or a chip-on-glass (COG) method, can be directly mounted on the display panel DP, or in some cases, can be provided on the display panel DP as integrated portions of the display panel DP. In addition, the SDICs can be implemented using a chip-on-film (COF) structure. In this case, the SDICs can be mounted on a circuit film and be electrically connected to the data lines DL of the display panel DP via the circuit film.

When a specific gate line GL is turned on by the gate driving circuit 110, the data driving circuit 120 converts the data voltage Vdata, received from the timing controller 140, into an analog image data voltage, and supplies the analog image data voltage to the plurality of data lines DL.

The data driving circuit 120 can be located on the upper or lower portion of (or above or below) the display panel DP or on both the upper and lower portions of (or above and below) the display panel DP, depending on the driving method, the design, or the like.

The data driving circuit 120 can include a shift register, a latch circuit, a digital-to-analog converter (DAC), an output buffer, and the like. The digital-to-analog converter is a component for converting the data voltage Vdata, received from the timing controller 140, into an analog image data voltage to be supplied to the data lines DL.

The touch driving circuit 130 determines a touch event (i.e., determines whether or not a touch has occurred) and determines a touch position on the display panel DP. The touch driving circuit 130 can include a driving circuit generating a driving voltage to drive the touch electrodes and a sensing circuit sensing the touch electrodes and generating data, from which the touch event, information regarding touch coordinates, and the like are detected. The driving circuit and the sensing circuit of the touch driving circuit 130 can be implemented as an integrated circuit (IC) referred to as a readout IC (ROIC) or be provided as separate components divided according to the function.

In addition, the SDICs of the data driving circuit 120 can be combined with the ROIC of the touch driving circuit 130 so as to provide source-readout integrated circuits SRIC.

The touch driving circuit 130 can be provided on an outer substrate connected to the display panel DP. The touch driving circuit 130 is connected to the display panel DP via a plurality of sensing lines SL. The touch driving circuit 130 can determine the touch event and the touch position, on the basis of a difference in capacitance among the touch electrodes in the display panel DP. For example, a difference in capacitance occurs between a location touched by a finger of a user and a location not touched by the finger, and the touch driving circuit 130 determines the touch event and position by detecting the difference in capacitance. The touch driving circuit 130 generates a touch sensing voltage regarding the touch event and position and transfers the touch sensing voltage to the micro-control unit 150.

The micro-control unit 150 controls the touch driving circuit 130. The micro-control unit 150 can receive a control synchronization signal Csync from the timing controller 140 and generate a touch synchronization signal Tsync on the basis of the control synchronization signal to control the touch driving circuit 130. The micro-control unit 150 transmits and receives touch sensing signals or the like to and from the touch driving circuit 130 on the basis of an interface IF defined therebetween.

Here, the micro-control unit 150 can be combined with the touch driving circuit 130 into a touch control circuit comprised of an IC or can be combined with the timing controller 140 into a control circuit comprised of an IC.

In addition, the touch display device can further include a memory (MEM). The memory can temporarily store the data voltage Vdata output from the timing controller 140 and can output the data voltage Vdata to the data driving circuit 120 at preset points in time. The memory can be disposed inside or outside the data driving circuit 120. In a case in which the memory is disposed outside the data driving circuit 120, the memory can be disposed between the timing controller 140 and the data driving circuit 120. In addition, the memory can include a buffer memory to store the data voltage Vdata received from an external source and supply the stored data voltage Vdata to the timing controller 140.

In addition, the touch display device can include an interface enabling the touch display device to input and output signals to and from or to communicate with other external electronic devices or electronic components. For example, the interface can include at least one of a low-voltage differential signaling (LVDS) interface, and a mobile industry processor interface (MIPI) serial interface, or a combination thereof.

The touch display device can be one of various types of devices, such as liquid crystal display, organic light-emitting display, and plasma display panel.

The touch display device can determine a touch event and touch coordinates on the basis of capacitance generated on touch electrodes (TE).

The touch display device can detect a touch by capacitance-based touch sensing, and more particularly, can detect a touch by mutual capacitance touch sensing or self-capacitance touch sensing.

In the mutual capacitance touch sensing, a plurality of touch electrodes can be categorized as driving electrodes to which a touch driving signal is applied through driving lines and sensing electrodes from which a sensing signal is generated through sensing lines, the sensing electrodes generating capacitance with the driving electrodes. The driving lines and the sensing lines can be collectively referred to as touch lines (TL).

In the mutual capacitance touch sensing, a touch event, touch coordinates, or the like can be determined on the basis of changes in mutual capacitance generated between the driving electrodes and the sensing electrodes, depending on the presence of a pointer, such as a finger or a pen (or stylus).

In the self-capacitance touch sensing, each of the touch electrodes serves as both a driving electrode and a sensing electrode. For example, the touch driving signal is applied to each of the touch electrodes, and a touch driving circuit 130 receives the touch sensing signals through the touch electrodes to which the touch driving signal is applied. Accordingly, in the self-capacitance touch sensing, there is no distinction between the driving electrodes and the sensing electrodes.

In the self-capacitance touch sensing, a touch event, touch coordinates, or the like can be determined on the basis of changes in capacitance generated between the pointer, such as a finger or a pen, and the touch electrodes.

In this manner, the touch display device can detect a touch by the mutual capacitance touch sensing or the self-capacitance touch sensing.

In addition, the touch display device can be one of various types of devices, such as liquid crystal display, organic light-emitting display, and plasma display panel.

Figure 2:
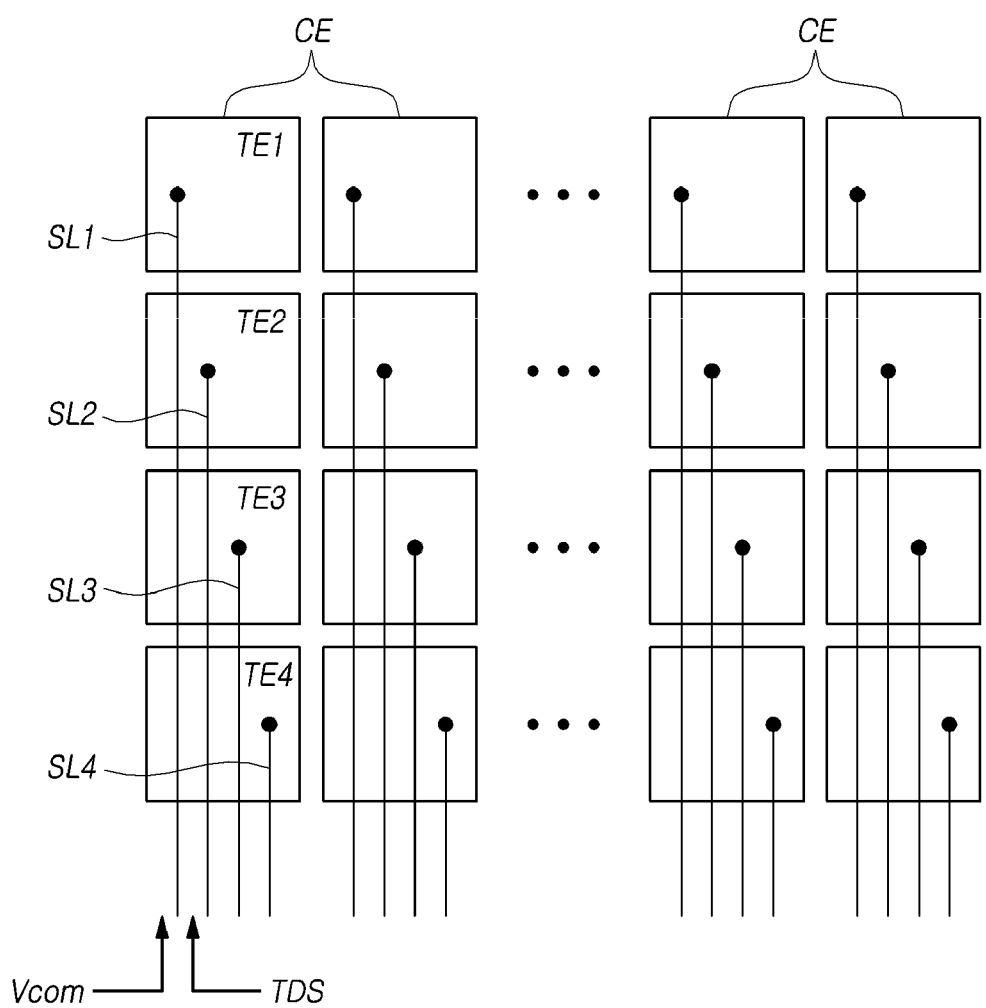
FIG. 2 is a block diagram illustrating a touchscreen panel provided in the display panel of the touch display device according to embodiments of the present disclosure.

FIG. 2 is a block diagram illustrating the touchscreen panel provided in the display panel of the touch display device according to embodiments.

Referring to FIG. 2, the touchscreen panel can have an incell touch structure in which the touchscreen panel is embedded in a pixel array area of the display panel DP. Here, the touchscreen panel having the incell touch structure can use common electrodes CE, provided inside the display panel DP in the shape of blocks or points, as touch electrodes TE.

In the touchscreen panel having the incell touch structure, each of common electrodes CE, included in the plurality of subpixels provided within the display panel DP, forms a touch electrode TE. The touch electrodes TE can be defined by the common electrodes CE separately provided in the display panel DP.

The plurality of touch electrodes TE can be arrayed in rows and columns in an active area of the display panel DP. Sensing lines SL, through which touch sensing signals are received, can be connected to the touch electrodes TE, respectively.

The touch electrodes TE can be capacitance sensors detecting a touch input on the basis of capacitance. The capacitance can be categorized into mutual capacitance and self-capacitance. The self-capacitance can be generated along a single-layer conductive line extending in a direction, while the mutual capacitance can be generated between two conductive lines perpendicularly intersecting each other.

The touch electrodes TE serve to supply a common voltage Vcom to subpixels during display periods and sense a touch input operation by receiving a touch driving signal TDS during touch sensing periods.

Figure 3:
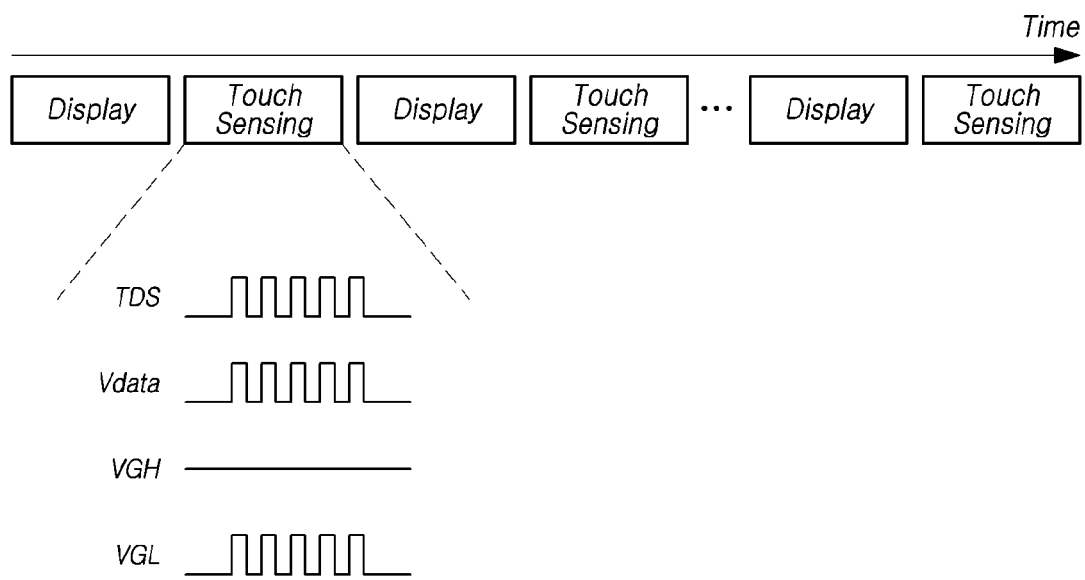
FIG. 3 is a timing diagram illustrating an example of display driving and touch sensing of the touch display device according to embodiments of the present disclosure in which the display driving and the touch sensing are performed in divided time periods, i.e., time slots.

FIG. 3 is a timing diagram illustrating an example of the display driving and the touch sensing of the touch display device according to embodiments in which the display driving and the touch sensing are performed in divided time periods, i.e., time slots.

Referring to FIG. 3, the touch display device according to embodiments can perform the touch sensing by driving the touch electrodes TE of the display panel DP in time periods (i.e., blank periods) between display driving periods.

For example, the touch display device can perform the touch sensing during vertical blank periods respectively present in an image frame. Alternatively, the touch display device can perform the touch sensing during some of a plurality of horizontal blank periods present in an image frame.

In a case in which the common electrodes CE of the display panel DP are used as the touch electrodes TE, the common voltage Vcom can be applied to the touch electrodes TE during the display driving periods, and the touch driving signal TDS can be applied to the touch electrodes TE during touch sensing periods.

The touch driving signal TDS can be a pulse signal, the voltage magnitude of which changes over time.

Since the display driving is not performed during the touch sensing periods, the electrodes or signal lines for the display driving can have no voltages applied thereto or can be in a constant-voltage state. Accordingly, parasitic capacitance can be generated among the touch electrodes TE to which the touch driving signal TDS is applied, the gate lines GL, the data lines DL, and the like, and detection performance for the touch sensing signals can be degraded by the parasitic capacitance.

To prevent parasitic capacitance generated among the touch electrodes TE, the gate lines GL, and the data lines DL, load free driving for reducing the effect of the parasitic capacitance of the touch electrodes TE on the result of the touch sensing can be performed by supplying an alternating current (AC) load free driving signal having the same voltage and phase as the touch driving signal TDS to the surrounding touch electrodes TE, data lines DL, and gate lines GL, not subjected to the touch sensing during the touch sensing periods.

Such load free driving supplies the data voltage Vdata of the input image signal to the data lines DL and simultaneously supplies a gate pulse comprised of a gate high voltage and a gate low voltage to the gate lines GL during the display driving periods. In addition, during the touch sensing periods, the load free driving supplies a load free common voltage and a load free gate low voltage in synchronization with the touch driving signal TDS to the data lines DL and the gate lines GL, respectively.

Here, the load free signal can be applied to the entirety of the data lines DL and the entirety of the gate lines GL disposed in the display panel DP. Alternatively, the load free signal can only be applied to some of the data lines DL related to the touch electrodes TE to be sensed or to some of the gate lines GL related to the touch electrodes TE to be sensed.

As described above, the supply of the alternating signal, the amplitude and phase of which are the same as those of the touch driving signal TDS, to the gate lines GL, the data lines DL, and the like can prevent parasitic capacitance between the touch electrodes TE and the sensing lines SL, thereby improving the ability to detect the touch sensing signals.

This is because voltages on both ports of the parasitic capacitor simultaneously change and because the smaller the difference between the voltages, the smaller the amount of electric charge stored in the parasitic capacitor is. Theoretically, when the load free driving is performed, the amount of electric charge stored in the parasitic capacitor can be zero (0). Accordingly, a load free effect the same as that obtained in a case having no parasitic capacitance can be obtained.

In addition, the touch display device can simultaneously perform the display driving and the touch sensing.

Figure 4:
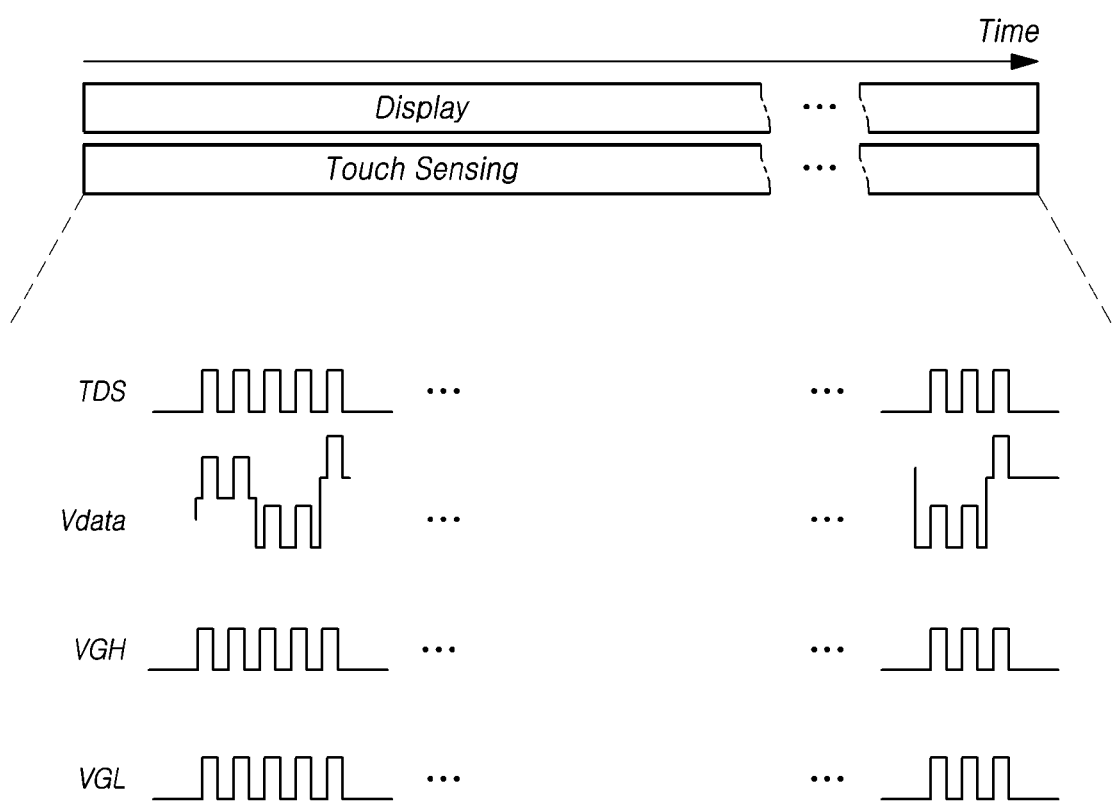
FIG. 4 is a timing diagram illustrating another example of the display driving and the touch sensing of the touch display device according to embodiments of the present disclosure in which the display driving and the touch sensing are simultaneously performed.

FIG. 4 is a timing diagram illustrating another example of the display driving and the touch sensing of the touch display device according to embodiments in which the display driving and the touch sensing are simultaneously performed.

Referring to FIG. 4, the touch display device according to embodiments can simultaneously perform the touch sensing during the display driving periods.

Here, the touch sensing periods can be the same as the display driving periods or can be blank periods between a plurality of display driving period. For example, the touch sensing can be independently performed, irrespective of the display driving, and thus, the touch sensing and the display driving can be simultaneously performed.

In a case in which the touch sensing is performed simultaneously with the display driving, the touch driving signal TDS can be applied to the touch electrodes TE. The data voltage Vdata can be supplied to the data lines DL for the display driving. In addition, a gate high voltage VGH, a gate low voltage VGL, and the like, used for the output of the scan signal applied, can be supplied to the gate lines GL.

Here, in a case in which the common electrodes of the display panel DP are used as the touch electrodes TE, a voltage difference corresponding to image data may not be formed between a common electrode and a corresponding pixel electrode to which the data voltage Vdata is applied, since the touch driving signal TDS is applied to the touch electrodes TE.

For example, since the voltage of the touch driving signal TDS changes over time, a voltage difference corresponding to the image data may not be formed between the common electrode to which the touch driving signal TDS is applied and the pixel electrode. Thus, the subpixels SP may not express luminous intensities corresponding to the image data.

Accordingly, the data voltage Vdata, modulated on the basis of the touch driving signal TDS, can be supplied to the data lines DL, so that the voltage difference corresponding to the image data can be formed between the common electrode to which the touch driving signal TDS is applied and the pixel electrode to which the data voltage Vdata, modulated on the basis of the touch driving signal TDS is applied.

The modulation of the data voltage Vdata can be performed by modulating, for example, a gamma voltage used to generate the data voltage Vdata in the data driving circuit 120. Alternatively, a ground voltage set for the display panel DP can be modulated so that a modulated data voltage Vdata can be supplied to the data lines DL.

In addition, the gate high voltage VGH and the gate low voltage VGL used for generating the scan signal supplied to the gate lines GL can be modulated on the basis of the touch driving signal TDS, so that the modulated scan signal can be applied to the gate lines GL to drive the gate lines GL ordinarily.

As described above, the gate high voltage VGH and the gate low voltage VGL used for generating the scan signal supplied to the gate lines GL and the data voltage Vdata applied to the data lines DL can be modulated on the basis of the touch driving signal TDS, so that the display driving and the touch sensing can be simultaneously performed.

Figure 5:
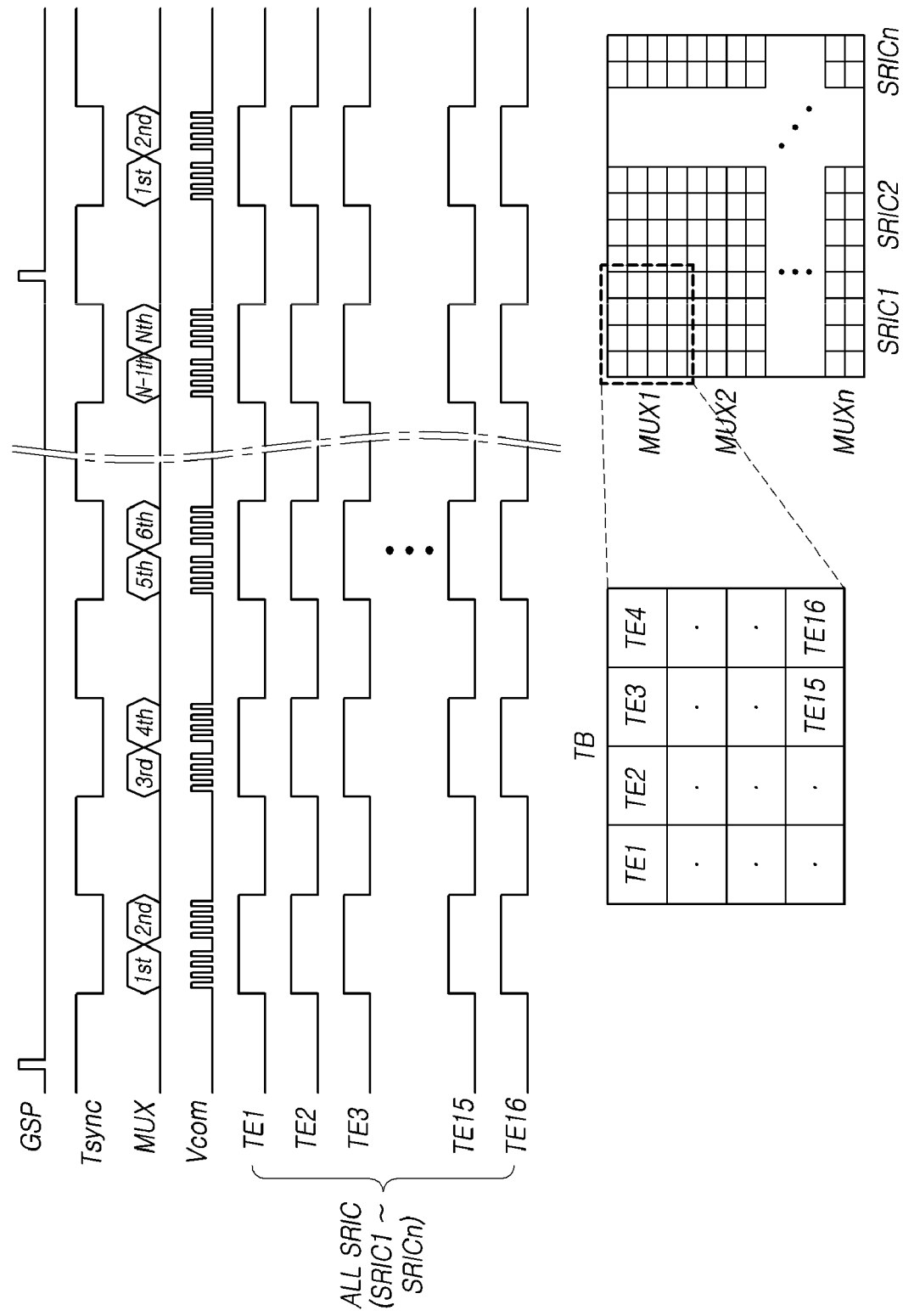
FIG. 5 is a diagram illustrating a case in which the entirety of the touch electrodes of the touch display device according to embodiments of the present disclosure are sensed during the touch sensing periods.

FIG. 5 is a diagram illustrating a case in which the entirety of the touch electrodes of the touch display device according to embodiments are sensed during the touch sensing periods.

Referring to FIG. 5, in the touch display device according to embodiments, the plurality of touch electrodes TE of the display panel DP can be grouped into a plurality of touch blocks TB. Each of the plurality of touch blocks TB refers to an area of a predetermined number of touch electrodes to which the scan signal applied by the gate driving circuit 110 through a multiplexer MUX and the touch driving signal TDS applied by a source-readout integrated circuit SRIC are simultaneously supplied.

Herein, as an example, the touch driving signal TDS has been described as being applied by the source-readout integrated circuits SRIC provided by combining the SDICs of the data driving circuit 120 and the ROIC of the touch driving circuit 130.

For example, in a case in which the touch driving signal TDS applied to 4 columns of touch electrodes TE is controlled by a source-readout integrated circuit SRIC and the scan signal applied to 4 rows of touch electrodes TE is controlled by a multiplexer MUX, each of the touch blocks TB can consist of 16 touch electrodes TE1, . . . , and TE16 arranged in a 4×4 matrix.

Here, a plurality of multiplexers MUX1, . . . , and MUXn can supply the scan signal at different times, respectively. Here, n can be a number such as a positive integer. Thus, the touch sensing can be performed on first to fourth rows of touch electrodes TE driven by the first multiplexer MUX1 and fifth to eighth rows of touch electrodes TE driven by the second multiplexer MUX2, with the touch driving signal TDS being independently applied to the first to fourth rows of touch electrodes TE and the fifth to eighth rows of touch electrodes TE.

In this structure, in a time segment in which the touch synchronization signal Tsync is maintained at a low level after the application of the gate start pulse signal GSP, when any multiplexer MUX is driven with the touch driving signal TDS being applied through the corresponding source-readout integrated circuit SRIC, the entirety of the 16 touch electrodes TE1, . . . , and TE16 located in each of the touch blocks TB, to which a multiplexer MUX and a source-readout integrated circuit SRIC are assigned, can be sensed.

Here, if the touch driving signal TDS is supplied through all source-readout integrated circuits SRIC while the scan signal is being applied to all multiplexers MUX1, . . . , and MUXn during a touch sensing period or in a touch frame, the entirety of the touch electrodes TE can be simultaneously sensed.

As described above, in a case in which the entirety of the touch electrodes TE are sensed during a touch sensing period, a touch event and a touched position can be determined, irrespective of the portion of the display panel DP on which the finger or the pen is located, so that sensitivity in the touch sensing can be maximized.

However, this case necessarily increases power consumption, since the entirety of the touch electrodes are sensed, irrespective of whether or not the touch electrodes are located in the touched portion.

Figure 6:
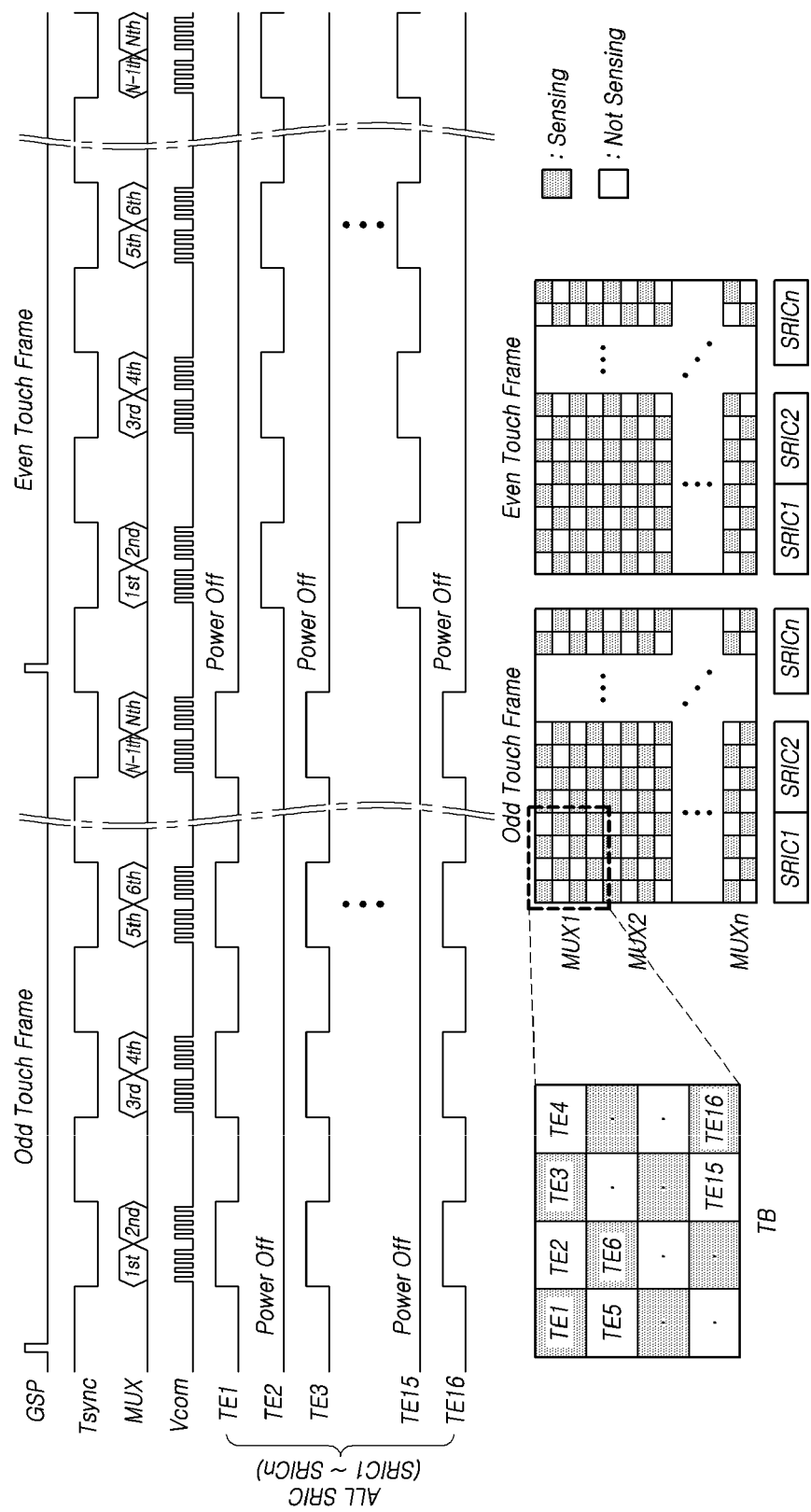
FIG. 6 is a diagram illustrating a case in which the touch electrodes of the touch display device according to embodiments of the present disclosure are alternately sensed during the touch sensing periods.

FIG. 6 is a diagram illustrating a case in which the touch electrodes of the touch display device according to embodiments are alternately sensed during the touch sensing periods.

Referring to FIG. 6, the touch display device according to embodiments can alternately sense odd touch electrodes TE1, TE3, . . . , and TE15 and even touch electrodes TE2, TE4, . . . , and TE16 of the 16 touch electrodes TE1, . . . , and TE16 in each of the touch blocks TB that can be simultaneously driven by the single multiplexer MUX and the single source-and-readout integrated circuit SRIC.

For example, the sensing can be performed by simultaneously applying the scan signal and the touch driving signal TDS to the odd touch electrodes TE1, TE3, . . . , and TE15 among the 16 touch electrodes TE1, . . . , and TE16, located in each of the single touch blocks, in odd touch sensing periods (or odd touch frames) and simultaneously applying the scan signal and the touch driving signal TDS to the even touch electrodes TE2, TE4, . . . , and TE16 among the 16 touch electrodes TE1, . . . , and TE16, located in the same touch block, in even touch sensing periods.

In a case in which the touch electrodes TE located in the each of the touch blocks TB are alternately sensed as described above, power consumption for the touch sensing can be reduced. However, the use of this driving method can inevitably reduce sensitivity in the operation of detecting a touch occurring in the touch blocks TB.

When a touch is detected in any touch block TB (i.e., a touch sensing block TSB), the touch display device of the present disclosure can increase the number of touch electrodes to be sensed in the touch sensing block TSB in which a touch is detected while reducing the number of touch electrodes to be sensed in non-touch sensing blocks in which no touch is detected, thereby reducing power consumption while maintaining sensitivity in the touch sensing.

Figure 7:
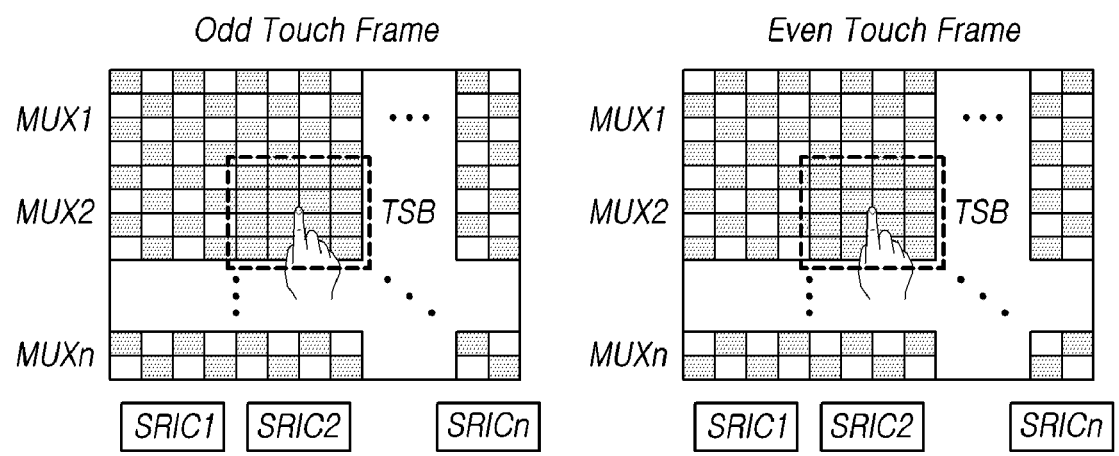
FIG. 7 is a diagram illustrating a touch driving method according to a first embodiment of the present disclosure.
Figure 8:
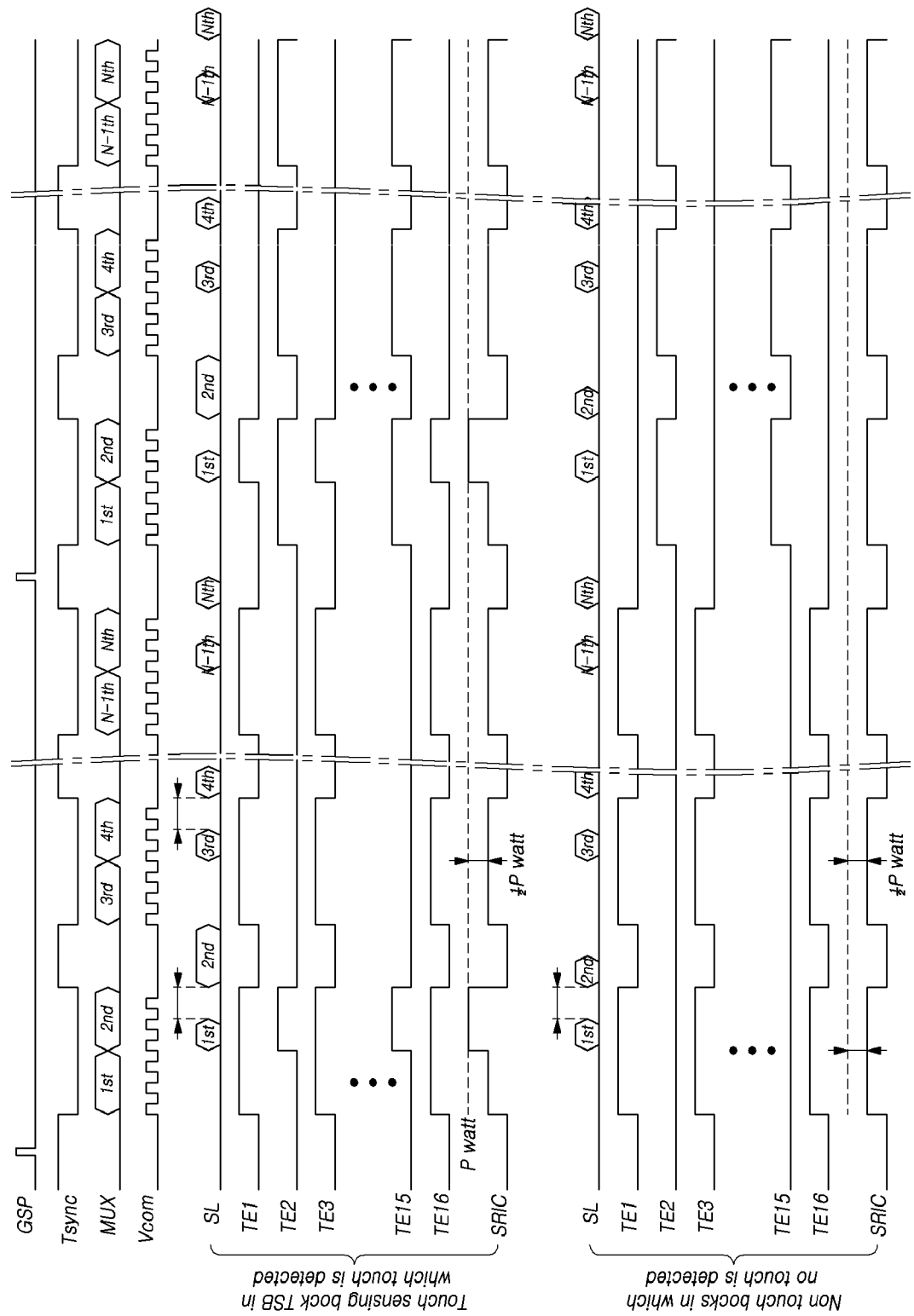
FIG. 8 is a signal flow diagram illustrating points in time at which touch electrodes in touch blocks are sensed by the touch driving method according to the first embodiment.

FIG. 7 is a diagram illustrating a touch driving method according to a first embodiment, while FIG. 8 is a signal flow diagram illustrating points in time at which touch electrodes in touch blocks are sensed by the touch driving method according to the first embodiment.

Referring to FIGS. 7 and 8, the touch driving method according to the first embodiment can continuously sense all touch electrodes TE located in the touch sensing block TSB in which a touch is detected while alternately sensing odd touch electrodes TE and even touch electrodes TE located in non-touch blocks in which no touch is detected, thereby reducing power consumption while maintaining sensitivity in the touch sensing.

In the following description, as in the above-described case, each of the touch blocks TB will be regarded as consisting of 16 touch electrodes TE1, . . . , and TE16 arranged in a 4×4 matrix, the touch driving signal TDS applied to 4 columns of touch electrodes TE will be regarded as being controlled by a source-readout integrated circuit SRIC, and the scan signal applied to 4 rows of touch electrodes TE will be regarded as being controlled by a multiplexer MUX.

For example, among the fifth to eighth rows of touch electrodes TE driven by the second multiplexer MUX2, a touch can be detected in the touch sensing block TSB in which the touch sensing is performed in response to the touch driving signal TDS applied by a second source-readout integrated circuit SRIC2. In this case, the entirety of the 16 touch electrodes TE1, . . . , and TE16 in the touch sensing block TSB can be continuously sensed while the odd touch electrodes TE1, TE3, . . . , and TE15 and the even touch electrodes TE2, TE4, . . . , and TE16 in the non-touch blocks TB, other than the touch sensing block TSB, can be alternately sensed.

Since it is highly probable that a touch operation performed in the display panel DP will typically be performed along a continuous line starting from a touch point to adjacent points, even when the entirety of the touch electrodes TE in the touch sensing block TSB in which a touch is detected are continuously sensed and the remaining touch blocks TB are alternately sensed as in the first embodiment, sensitivity in the touch sensing may not be reduced and an effect of reducing power consumption can be obtained.

For example, during the scan signal being applied by the second multiplexer MUX2, the second source-readout integrated circuit SRIC2 can sense the entirety of the touch sensing signals from the 16 touch electrodes TE1, . . . , and TE16, whereas, during the scan signal being applied by the other multiplexers MUX1, MUX3, and . . . , the touch sensing signals from the 8 odd touch electrodes TE1, TE3, . . . , and TE15 or the 8 even touch electrodes TE2, TE4, . . . , and TE16 can be sensed. Accordingly, power consumption for driving the source-readout integrated circuit SRIC can be reduced.

Figure 9:
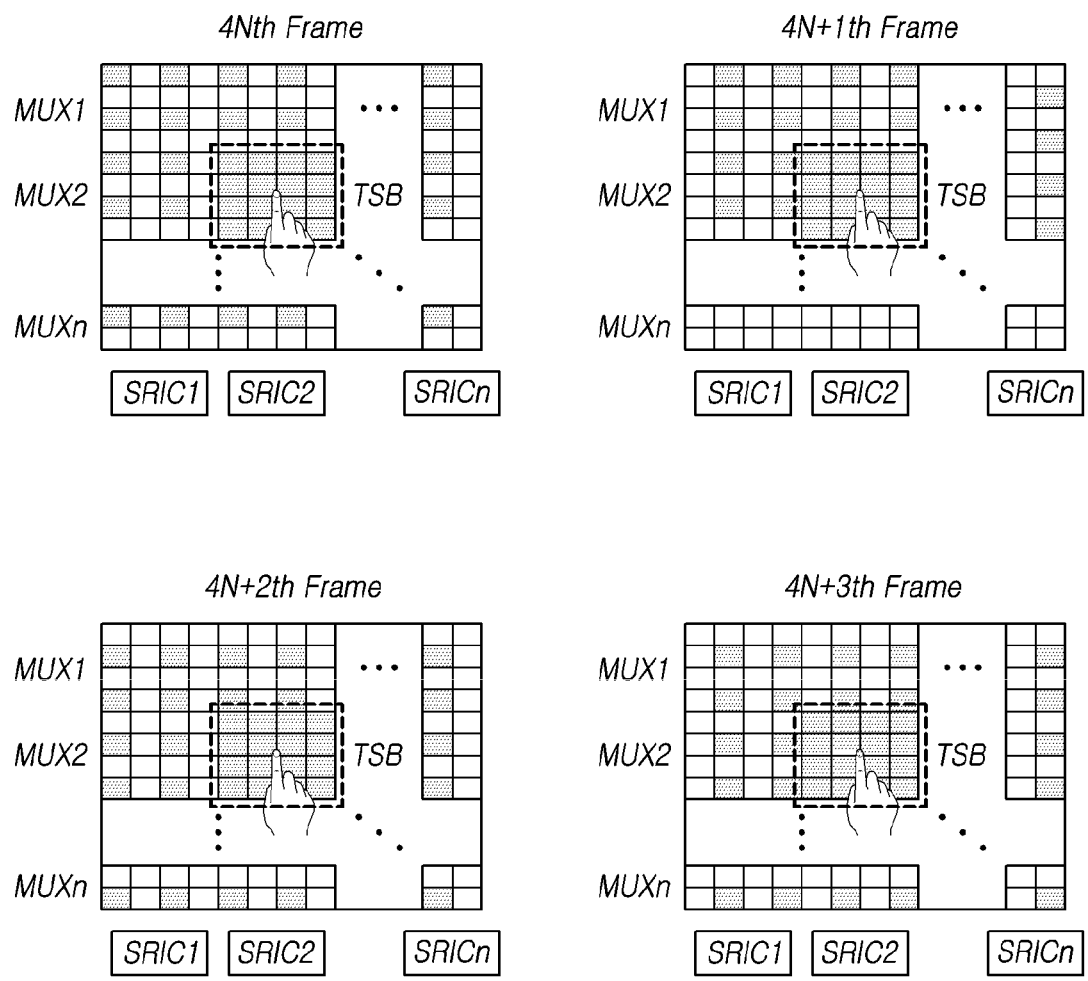
FIG. 9 is a diagram illustrating a touch driving method according to a second embodiment of the present disclosure.
Figure 10:
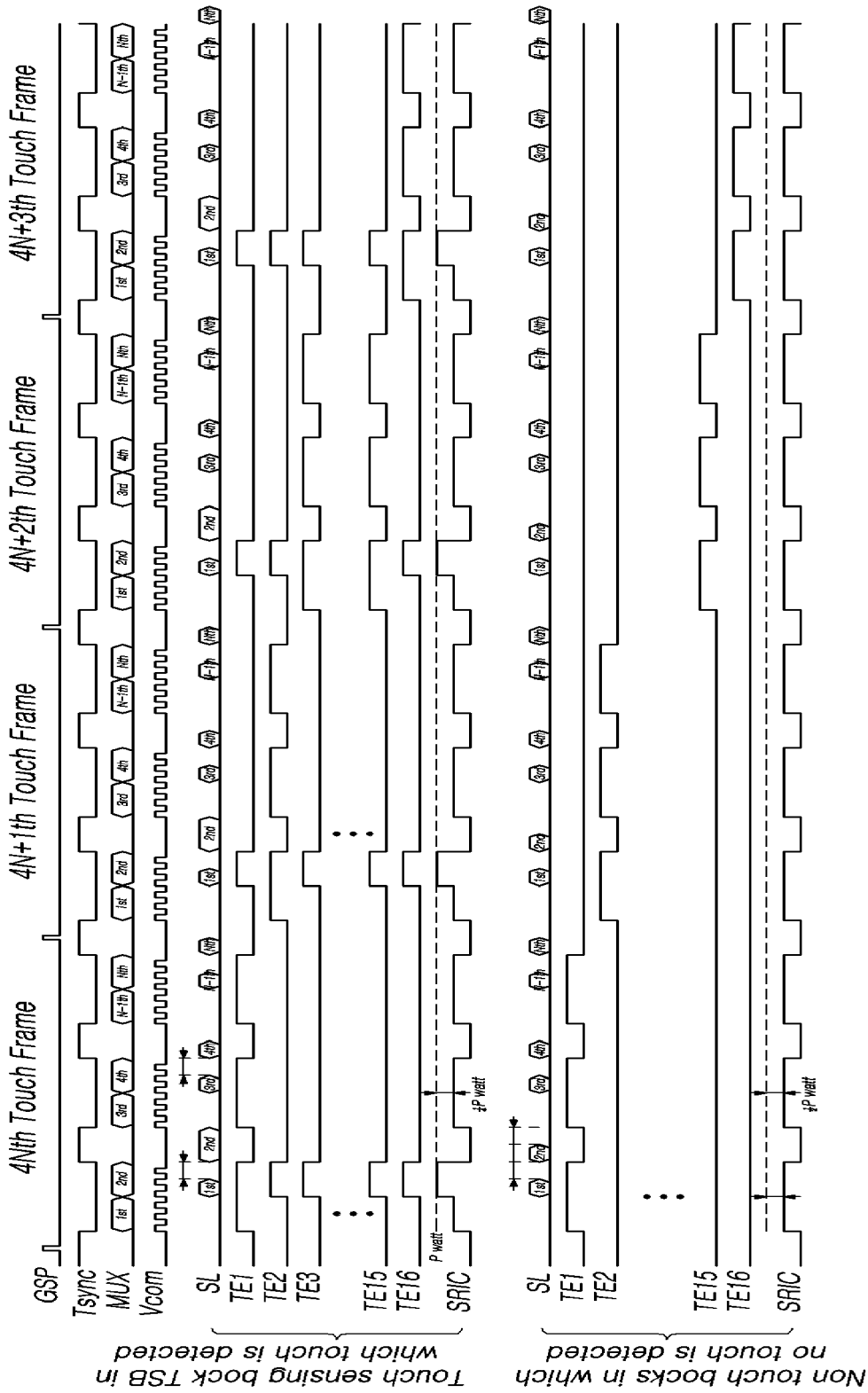
FIG. 10 is a signal flow diagram illustrating points in time at which touch electrodes in touch blocks are sensed by the touch driving method according to the second embodiment.

FIG. 9 is a diagram illustrating a touch driving method according to a second embodiment, while FIG. 10 is a signal flow diagram illustrating points in time at which touch electrodes in touch blocks are sensed by the touch driving method according to the second embodiment.

Referring to FIGS. 9 and 10, the touch driving method according to the second embodiment can continuously sense all touch electrodes located in the touch sensing block TSB in which a touch is detected while sequentially sensing 4 touch electrodes per frame in non-touch blocks in which no touch is detected. Thus, the touch driving method can reduce power consumption while maintaining sensitivity in the touch sensing.

For example, among the fifth to eighth rows of touch electrodes TE driven by the second multiplexer MUX2, a touch can be detected in the touch sensing block TSB in which the touch sensing is performed in response to the touch driving signal TDS applied by the second source-readout integrated circuit SRIC2. In this case, the entirety of the 16 touch electrodes TE1, . . . , and TE16 in the touch sensing block TSB can be continuously sensed, whereas square matrices of 4 touch electrodes TE1, TE2, TE5, and TE6; TE3, TE4, TE7, and TE8; TE9, TE10, TE13, TE14; and TE11, TE12, TE15, and TE16 in each of the non-touch blocks TB, other than the touch sensing block TSB, can be sequentially sensed per frame.

Since it is highly probable that a touch operation performed in the display panel DP will typically be performed along a continuous line starting from a touch point to adjacent points, even when the entirety of the touch electrodes TE in the touch sensing block TSB in which a touch is detected are continuously sensed and the 4 touch electrodes TE1, TE2, TE5, and TE6 in the remaining touch blocks TB are sequentially sensed per frame as in the second embodiment, sensitivity in the touch sensing may not be reduced and an effect of reducing power consumption can be obtained.

For example, during the scan signal being applied by the second multiplexer MUX2, the second source-readout integrated circuit SRIC2 can sense the entirety of the touch sensing signals from the 16 touch electrodes TE1, . . . , and TE16. In addition, during the scan signal being applied by the other multiplexers MUX1, MUX3, and . . . , the touch sensing signals from the 4 touch electrodes can be sensed. Accordingly, power consumption for driving the source-readout integrated circuit SRIC can be reduced.

Figure 11:
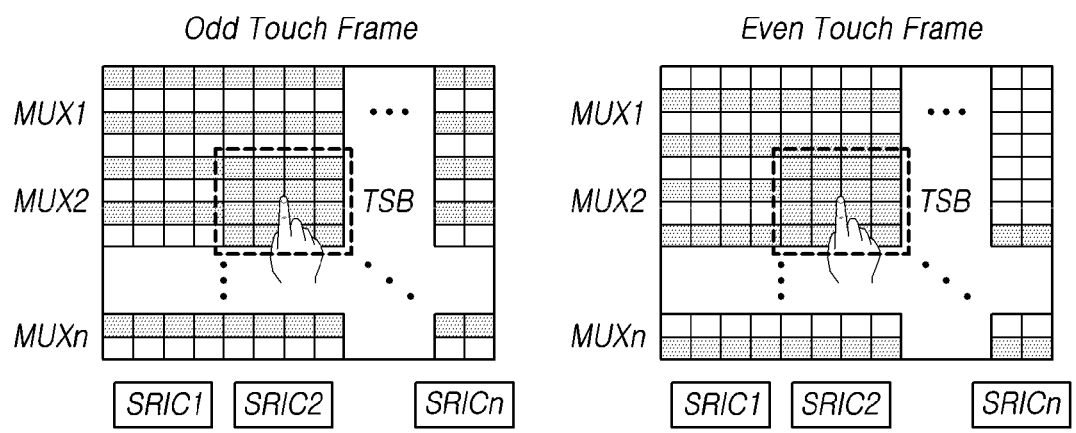
FIG. 11 is a diagram illustrating a touch driving method according to a third embodiment of the present disclosure.

FIG. 11 is a diagram illustrating a touch driving method according to a third embodiment.

Referring to FIG. 11, the touch driving method according to the third embodiment can continuously sense all touch electrodes TE located in the touch sensing block TSB in which a touch is detected while alternately sensing odd rows of touch electrodes and even rows of touch electrodes located in non-touch blocks in which no touch is detected, thereby reducing power consumption while maintaining sensitivity in the touch sensing.

For example, among the fifth to eighth rows of touch electrodes TE driven by the second multiplexer MUX2, a touch can be detected in the touch sensing block TSB in which the touch sensing is performed in response to the touch driving signal TDS applied by the second source-readout integrated circuit SRIC2. In this case, the entirety of the 16 touch electrodes TE1, . . . , and TE16 in the touch sensing block TSB can be continuously sensed, whereas the odd rows of touch electrodes and the even rows of touch electrodes in the non-touch blocks TB, other than the touch sensing block TSB, can be alternately sensed.

Since it is highly probable that a touch operation performed in the display panel DP will typically be performed along a continuous line starting from a touch point to adjacent points, even when the entirety of the touch electrodes TE in the touch sensing block TSB in which a touch is detected are continuously sensed and the odd rows of touch electrodes and the even rows of touch electrodes in the remaining touch blocks TB are alternately sensed as in the third embodiment, sensitivity in the touch sensing may not be reduced and an effect of reducing power consumption can be obtained.

For example, during the scan signal being applied by the second multiplexer MUX2, the second source-readout integrated circuit SRIC2 can sense the entirety of the touch sensing signals from the 16 touch electrodes TE1, . . . , and TE16, whereas, during the scan signal being applied by the other multiplexers MUX1, MUX3, and . . . , the touch sensing signals from the 8 odd rows of touch electrodes TE1, TE2, TE3, TE4, TE9, TE10, TE11 and TE12, or the 8 even rows of touch electrodes TE5, TE6, TE7, TE8, TE13, TE14, TE15, and TE16 can be sensed. Accordingly, power consumption for driving the source-and-readout integrated circuit SRIC can be reduced.

Figure 12:
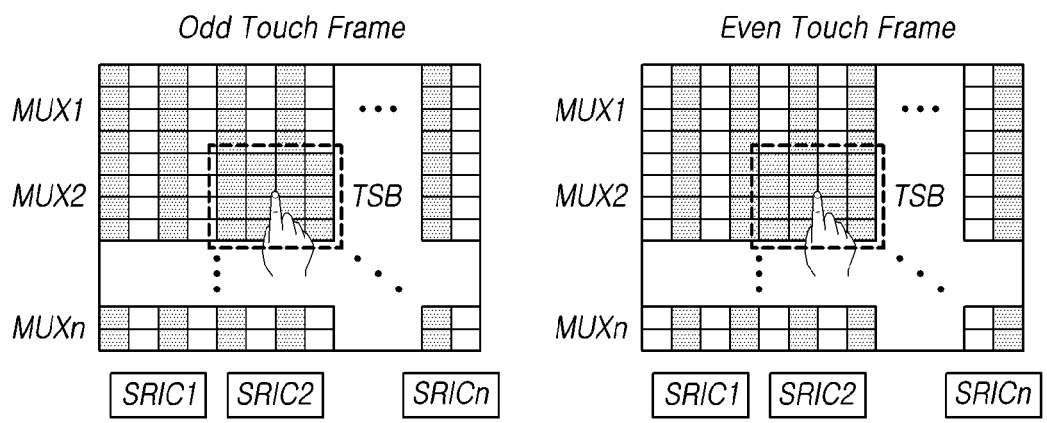
FIG. 12 is a diagram illustrating a touch driving method according to a fourth embodiment of the present disclosure.

FIG. 12 is a diagram illustrating a touch driving method according to a fourth embodiment.

Referring to FIG. 12, the touch driving method according to the third embodiment can continuously sense all touch electrodes TE located in the touch sensing block TSB in which a touch is detected while alternately sensing odd columns of touch electrodes TE and even columns of touch electrodes TE located in non-touch blocks in which no touch is detected, thereby reducing power consumption while maintaining sensitivity in the touch sensing.

For example, among the fifth to eighth rows of touch electrodes TE driven by the second multiplexer MUX2, a touch can be detected in the touch sensing block TSB in which the touch sensing is performed in response to the touch driving signal TDS applied by the second source-readout integrated circuit SRIC2. In this case, the entirety of the 16 touch electrodes TE1, . . . , and TE16 in the touch sensing block TSB can be continuously sensed, whereas the odd columns of touch electrodes TE and the even columns of touch electrodes TE in the non-touch blocks TB, other than the touch sensing block TSB, can be alternately sensed.

Since it is highly probable that a touch operation performed in the display panel DP will typically be performed along a continuous line starting from a touch point to adjacent points, even when the entirety of the touch electrodes TE in the touch sensing block TSB in which a touch is detected are continuously sensed and odd columns of touch electrodes TE and the even columns of touch electrodes TE in the remaining touch blocks TB are alternately sensed as in the fourth embodiment, sensitivity in the touch sensing may not be reduced and an effect of reducing power consumption can be obtained.

For example, during the scan signal being applied by the second multiplexer MUX2, the second source-readout integrated circuit SRIC2 can sense the entirety of the touch sensing signals from the 16 touch electrodes TE1, . . . , and TE16, whereas, during the scan signal being applied by the other multiplexers MUX1, MUX3, and . . . , the touch sensing signals from the 8 odd columns of touch electrodes TE1, TE5, TE9, TE13, TE3, TE7, TE11, and TE15 or 8 even columns of touch electrodes TE2, TE6, TE10, TE14, TE4, TE8, TE12, and TE16 can be sensed. Accordingly, power consumption for driving the source-and-readout integrated circuit SRIC can be reduced.

Figure 13:
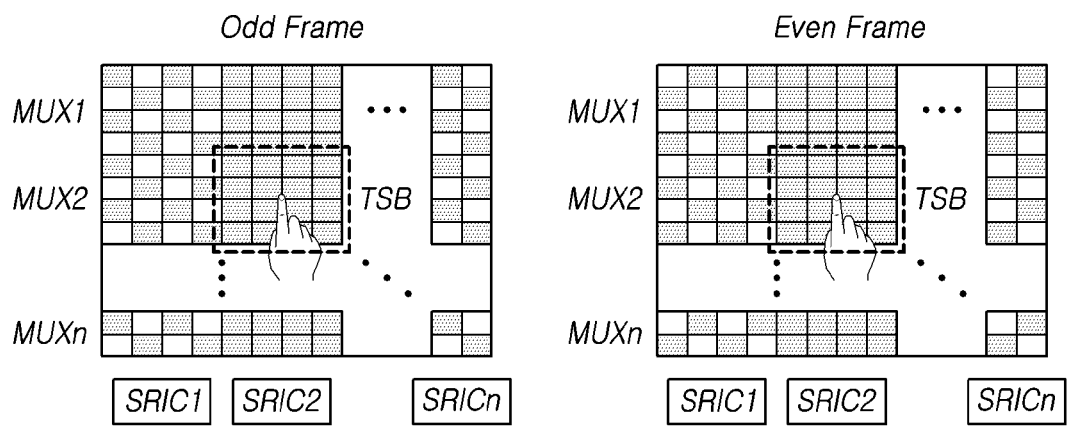
FIG. 13 is a diagram illustrating a touch driving method according to a fifth embodiment of the present disclosure.
Figure 14:
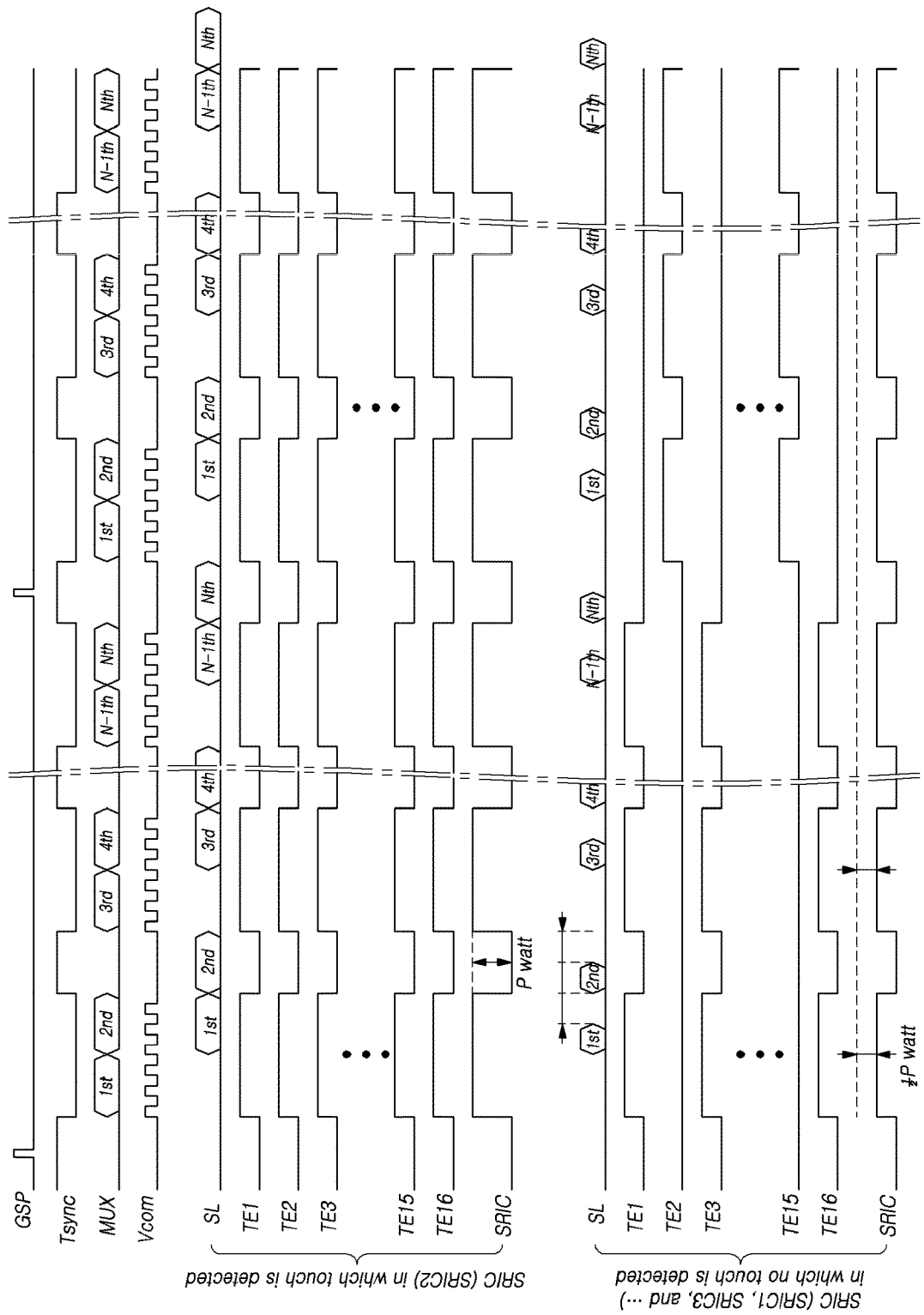
FIG. 14 is a signal flow diagram illustrating points in time at which touch electrodes in touch blocks are sensed by the touch driving method according to the fifth embodiment.

FIG. 13 is a diagram illustrating a touch driving method according to a fifth embodiment, while FIG. 14 is a signal flow diagram illustrating points in time at which touch electrodes in touch blocks are sensed by the touch driving method according to the fifth embodiment.

Referring to FIGS. 13 and 14, the touch driving method according to the fifth embodiment can continuously sense all touch electrodes TE located in touch blocks TB at the same columns as the touch sensing block TSB in which a touch is detected while alternately sensing odd touch electrodes TE and even touch electrodes TE located in non-touch blocks in which no touch is detected, thereby reducing power consumption while maintaining sensitivity in the touch sensing.

In a case in which each of the touch blocks TB consists of 16 touch electrodes TE1, . . . , and TE16 arranged in a 4×4 matrix and the touch driving signal TDS applied to 4 columns of touch electrodes TE is controlled by a source-readout integrated circuit SRIC as in the above-described cases, the touch blocks TB located in the same columns can be simultaneously sensed in response to the touch driving signal TDS being simultaneously applied by the single source-readout integrated circuit SRIC2.

For example, among the fifth to eighth rows of touch electrodes TE driven by the second multiplexer MUX2, a touch can be detected in the touch sensing block TSB in which the touch sensing is performed in response to the touch driving signal TDS applied by the second source-readout integrated circuit SRIC2. In this case, in response to the touch driving signal TDS being simultaneously applied by the second source-readout integrated circuit SRIC2, the entirety of the 16 touch electrodes TE1, . . . , and TE16 of the touch blocks TB located in the same columns as the touch sensing block TSB can be continuously sensed.

In contrast, in the touch blocks TB connected to source-readout integrated circuits SRIC1, . . . , SRIC3, and . . . , other than the second source-readout integrated circuit SRIC2, the odd touch electrodes TE1, TE3, . . . , and TE15 and the even touch electrodes TE2, TE4, . . . , and TE16 can be alternately sensed.

Since it is highly probable that a touch operation performed in the display panel DP will typically be performed along a continuous line starting from a touch point to adjacent points, even when the entirety of the touch electrodes TE in the touch blocks located at the same columns as the touch sensing block TSB in which a touch is detected are continuously sensed and the remaining touch blocks TB are alternately sensed as in the fifth embodiment, sensitivity in the touch sensing may not be reduced and an effect of reducing power consumption can be obtained.

For example, the touch sensing can be performed by simultaneously applying the touch driving signal TDS to the 16 touch electrodes TE1, . . . , and TE16 in the entirety of the touch blocks TB located in the same columns as the touch sensing block TSB in the second source-readout integrated circuit SRIC2 connected to the touch sensing block TSB in which a touch is detected, whereas the source-and-readout integrated circuits SRIC1, . . . , SRIC3, and . . . , other than the second source-readout integrated circuit SRIC2, can alternately sense odd touch electrodes TE and even touch electrodes TE located in non-touch blocks in which no touch is detected. Accordingly, power consumption for driving the source-readout integrated circuit SRIC can be reduced.

Figure 15:
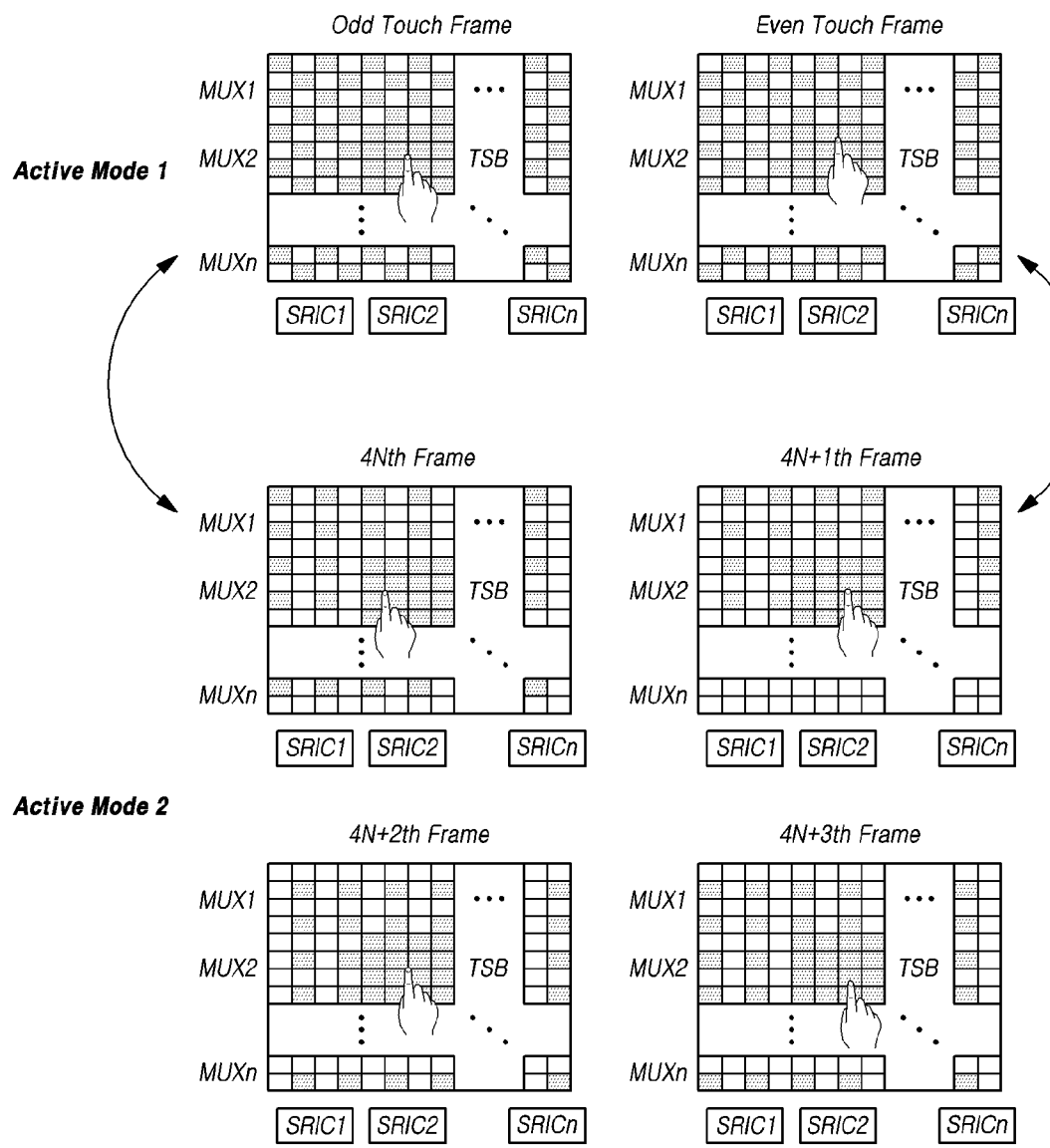
FIG. 15 is a process diagram illustrating a touch driving method according to a sixth embodiment of the present disclosure.
Figure 16:
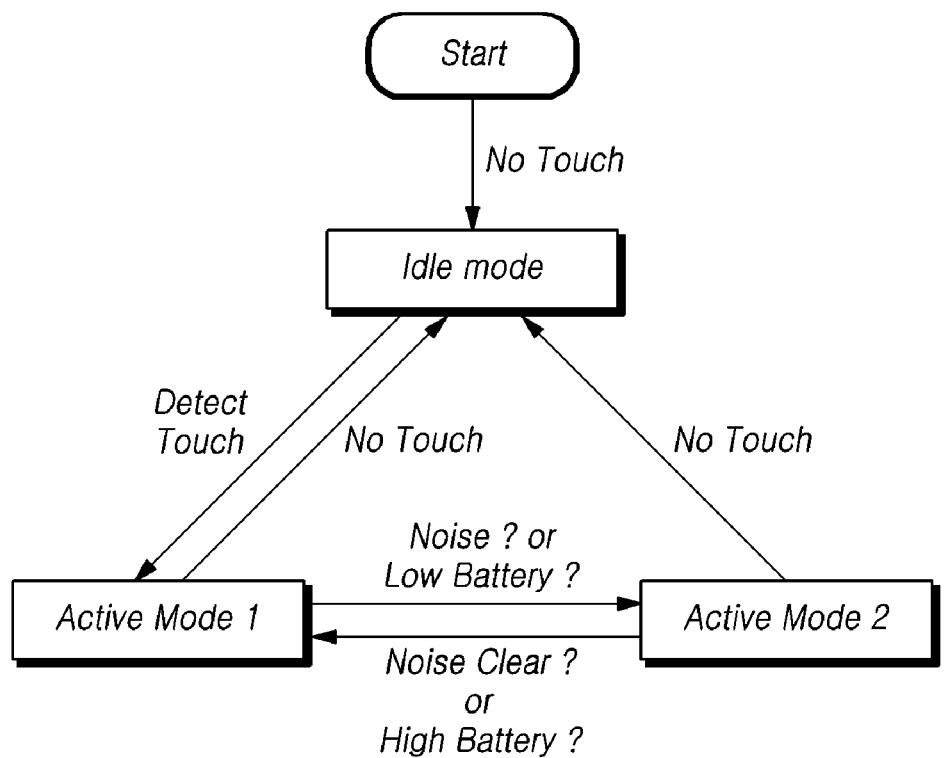
FIG. 16 is a flowchart illustrating the touch driving method according to the sixth embodiment.

FIG. 15 is a process diagram illustrating a touch driving method according to a sixth embodiment, while FIG. 16 is a flowchart illustrating the touch driving method according to the sixth embodiment.

Referring to FIGS. 15 and 16, the touch driving method according to the sixth embodiment can continuously sense all touch electrodes TE located in the touch sensing block TSB in which a touch is detected while sensing non-touch blocks in which no touch is detected, on the basis of a plurality of active modes depending on the status of the touch display device, thereby reducing power consumption while maintaining sensitivity in the touch sensing.

For example, the plurality of active modes can include a first active mode and a second active mode. In the first active mode, in a case in which the entirety of the touch electrodes TE located in the touch sensing block TSB in which a touch is detected are continuously sensed, odd touch electrodes TE and even touch electrodes TE in non-touch blocks in which no touch is detected can be alternately sensed. In the second active mode, in a case in which the entirety of the touch electrodes TE located in the touch sensing block TSB in which a touch is detected are continuously sensed, 4 touch electrodes in non-touch blocks in which no touch is detected can be sequentially sensed per frame.

Among the fifth to eighth rows of touch electrodes TE driven by the second multiplexer MUX2, a touch can be detected in the touch sensing block TSB in which the touch sensing is performed in response to the touch driving signal TDS being applied by the second source-readout integrated circuit SRIC2. In this case, in the first active mode, the entirety of the 16 touch electrodes TE1, ..., and TE16 in the touch sensing block TSB can be continuously sensed, whereas the odd touch electrodes TE and the even touch electrodes TE of the touch blocks TB, other than the touch sensing block TSB, can be alternately sensed.

In the second mode, the entirety of the 16 touch electrodes TE1, ..., and TE16 in the touch sensing block TSB can be continuously sensed, and the 4 touch electrodes of the touch blocks TB, other than the touch sensing block TSB, can be sequentially sensed per frame.

The active modes in which the touch sensing is performed on the touch sensing block TSB in which a touch is detected can be divided into the first active mode and the second active mode as described above. This can be more effective when intended to manage power consumption specifically and efficiently, depending on the status of the touch display device, such as the strength of power or the presence of noise.

For example, as illustrated in FIG. 16, when no touch is detected, the entirety of the touch electrodes TE of the display panel DP can be alternately sensed in an idle mode. When a touch is detected in any touch block TB (i.e., the touch sensing block TSB), the first active mode can be initiated. For example, all touch electrodes TE in the touch sensing block TSB can be continuously sensed, and in non-touch blocks in which no touch is detected, odd touch electrodes TE and even touch electrodes TE can be alternately sensed. In the first active mode, when the strength of power of the touch display device is reduced or when noise is being introduced, the second active mode of sequentially sensing 4 touch electrodes TE in non-touch blocks one by one can be performed. Accordingly, the power consumption of the touch display device can be reduced in a stepwise manner.

The above-described driving method is applicable, since the touch electrodes TE of the touch blocks TB can be used in a stepwise manner, although a method of alternately sensing the touch electrodes TE of the touch blocks TB at a ½ period and a method of sensing the touch electrodes TE of the touch blocks TB at a ¼ period can be selectively used.

Figure 17:
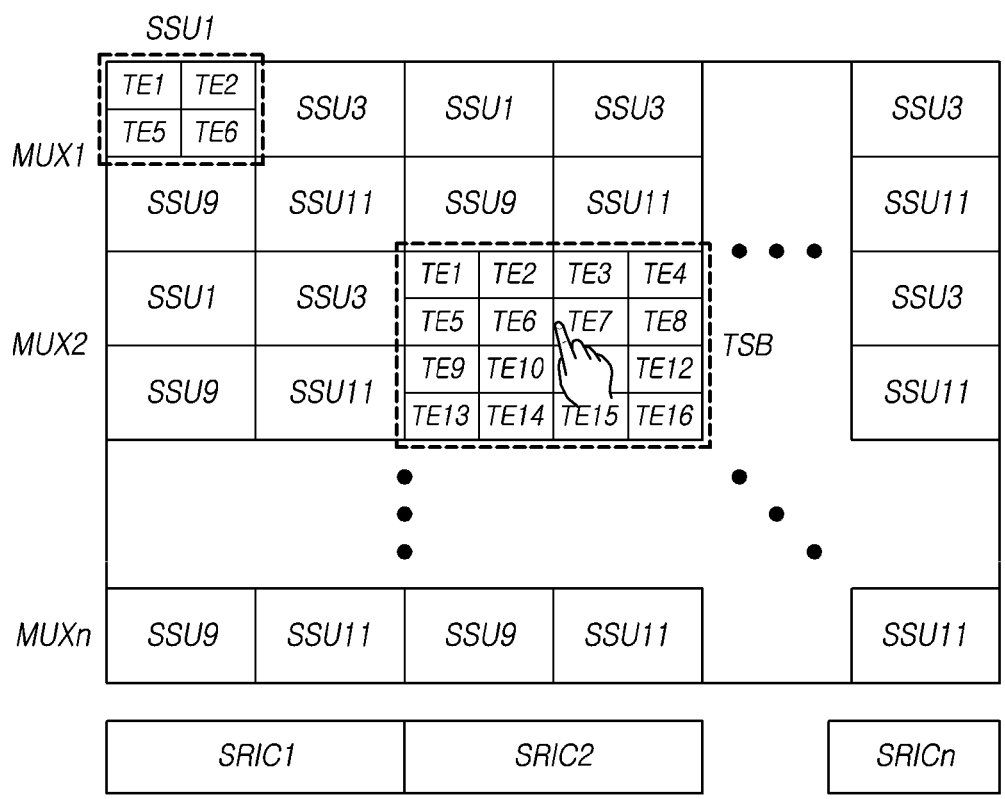
FIGS. 17 to 19 are diagrams illustrating a touch driving method according to a seventh embodiment of the present disclosure.
Figure 18:
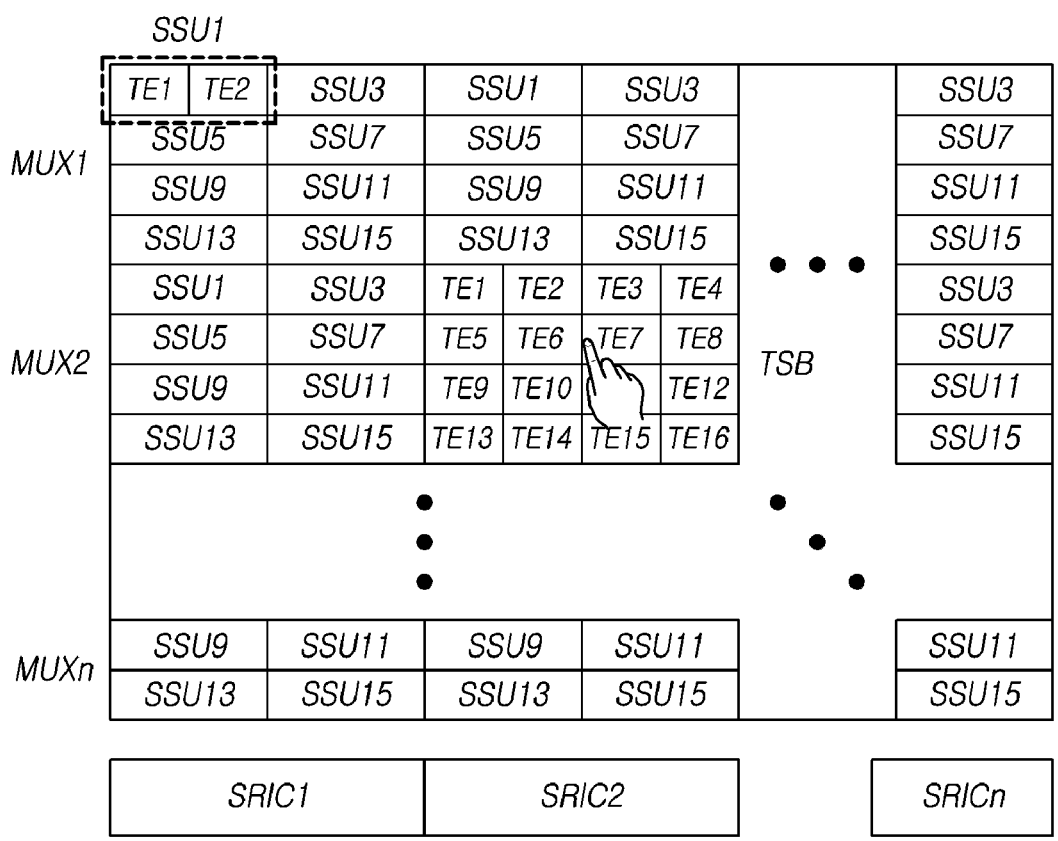
Figure 19:
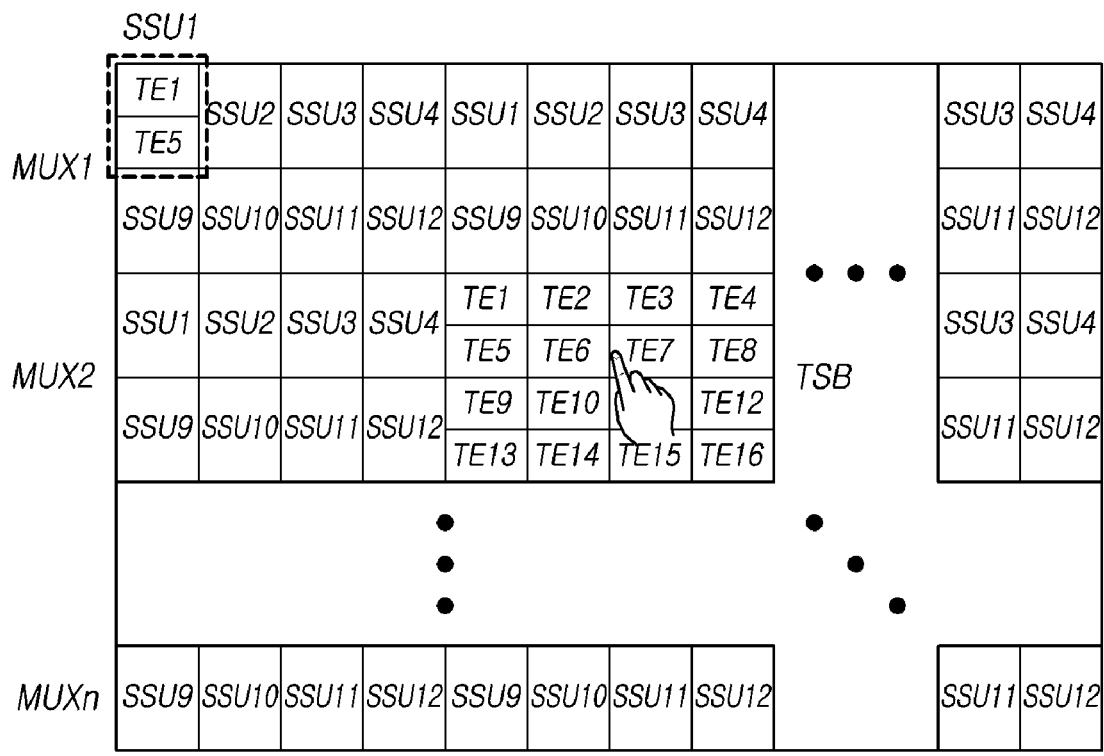

FIGS. 17 to 19 are diagrams illustrating a touch driving method according to a seventh embodiment.

Referring to FIGS. 17 to 19, the touch driving method according to the seventh embodiment can continuously sense the entirety of the touch electrodes of the touch blocks TB located at the same columns as the touch sensing block TSB in which a touch is detected while sensing a plurality of touch electrodes TE among the touch electrodes TE in each of non-touch blocks in which no touch is detected using a single sensing unit SSU, thereby reducing power consumption while maintaining sensitivity in the touch sensing.

For example, among the fifth to eighth rows of touch electrodes TE driven by the second multiplexer MUX2, a touch can be detected in the touch sensing block TSB in which the touch sensing is performed in response to the touch driving signal TDS applied by the second source-readout integrated circuit SRIC2. In this case, the touch driving signal TDS can be simultaneously applied to the touch sensing block TSB by the second source-readout integrated circuit SRIC2, and the touch sensing signals can be sensed from the 16 touch electrodes TE1, ..., and TE16 in the touch sensing block TSB. At the same time, a plurality of touch electrodes TE among the touch electrodes TE in each of the touch blocks TB, other than the touch sensing block TSB, can be sensed by the single sensing unit SSU.

For example, the sensing units SSU sensing the touch sensing signals in the source-readout integrated circuit SRIC can receive the touch sensing signal from each of the touch electrodes TE driven by the single multiplexer MUX. In particular, the touch sensing signal from each of the touch electrodes TE in the touch sensing block TSB in which a touch is detected can be sensed by a sensing unit SSU, whereas a plurality of touch electrodes TE among the touch electrodes TE in each of the non-touch blocks in which no touch is detected can be commonly connected to one sensing unit SSU. Accordingly, the number of the sensing units SSU can be reduced, thereby reducing power consumption.

In a case illustrated in FIG. 17, 4 touch electrodes (e.g., TE1, TE2, TE5, and TE6) arranged in the form of a square matrix, in each of the non-touch blocks in which no touch is detected, are commonly connected to one sensing unit (e.g., SSU1), whereby the number of the sensing units SSUs operating for the non-touch blocks can be reduced to ¼.

In a similar manner, FIG. 18 illustrates a case in which two touch electrodes (e.g., TE1 and TE2) in a row direction in each of the non-touch blocks in which no touch is detected are commonly connected to one sensing unit (e.g., SSU1), whereby the number of the sensing units SSUs operating for the non-touch blocks can be reduced to ½.

In addition, FIG. 19 illustrates a case in which two touch electrodes (e.g., TE1 and TE5) in a column direction in each of the non-touch blocks in which no touch is detected are commonly connected to one sensing unit (e.g., SSU1), whereby the number of the sensing units SSUs operating for the non-touch blocks can be reduced to ½.

Figure 20:
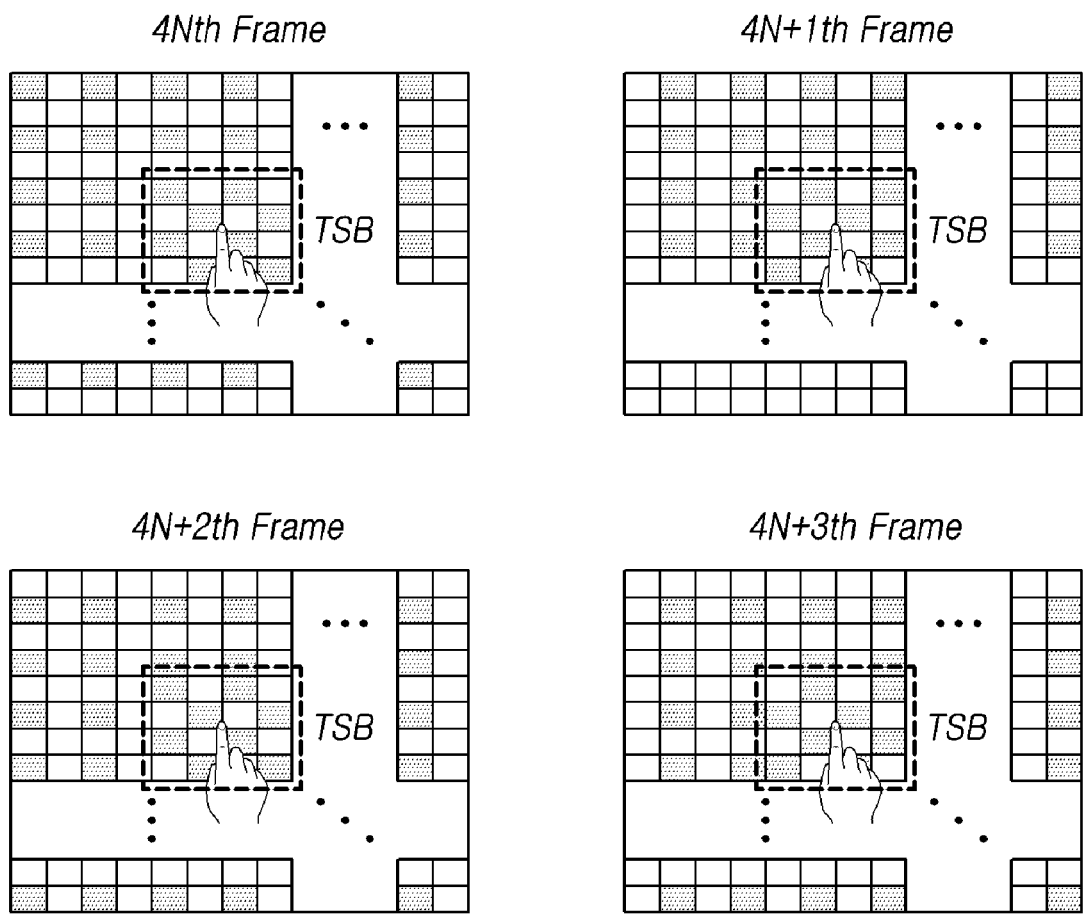
FIG. 20 is a diagram illustrating a touch driving method according to an eighth embodiment of the present disclosure.

FIG. 20 is a diagram illustrating a touch driving method according to an eighth embodiment.

Referring to FIG. 20, the touch driving method according to the eighth embodiment can sense a greater number of touch electrodes TEs in the touch sensing block TSB in which a touch is detected than in each of non-touch blocks in which no touch is detected, thereby reducing power consumption while maintaining sensitivity in the touch sensing.

Here, the touch driving method may not sense the entirety of the touch electrodes TEs in the touch sensing block TSB in which a touch is detected, but can control the number of touch electrodes TEs to be sensed at a predetermined period.

For example, the number of the touch electrodes TE simultaneously sensed in each of the non-touch blocks in which no touch is detected can be selected to be ¼ number of touch electrodes TEs in the non-touch block at one frame, whereas the number of the touch electrodes TEs simultaneously sensed in the touch sensing block TSB in which a touch is detected can be selected to be ½ number of touch electrodes TEs in the touch sensing block TSB at one frame so that odd touch electrodes TE and even touch electrodes TE are alternately sensed.

For example, among the fifth to eighth rows of touch electrodes TE driven by the second multiplexer MUX2, a touch can be detected in the touch sensing block TSB in which the touch sensing is performed in response to the touch driving signal TDS being applied by the second source-readout integrated circuit SRIC2. In this case, the odd touch electrodes TE and the even touch electrodes TE among the 16 touch electrodes TE1, . . . , and TE16 in the touch sensing block TSB can be alternately sensed, and the 4 touch electrodes TE of each of the touch blocks TB, other than the touch sensing block TSB, can be alternately sensed per frame at a ¼ period.

In this case, the touch driving signal TDS can also be applied to the touch sensing block TSB in which a touch is detected and the driving period of the touch sensing can be reduced, thereby further reducing power consumption.

Figure 21:
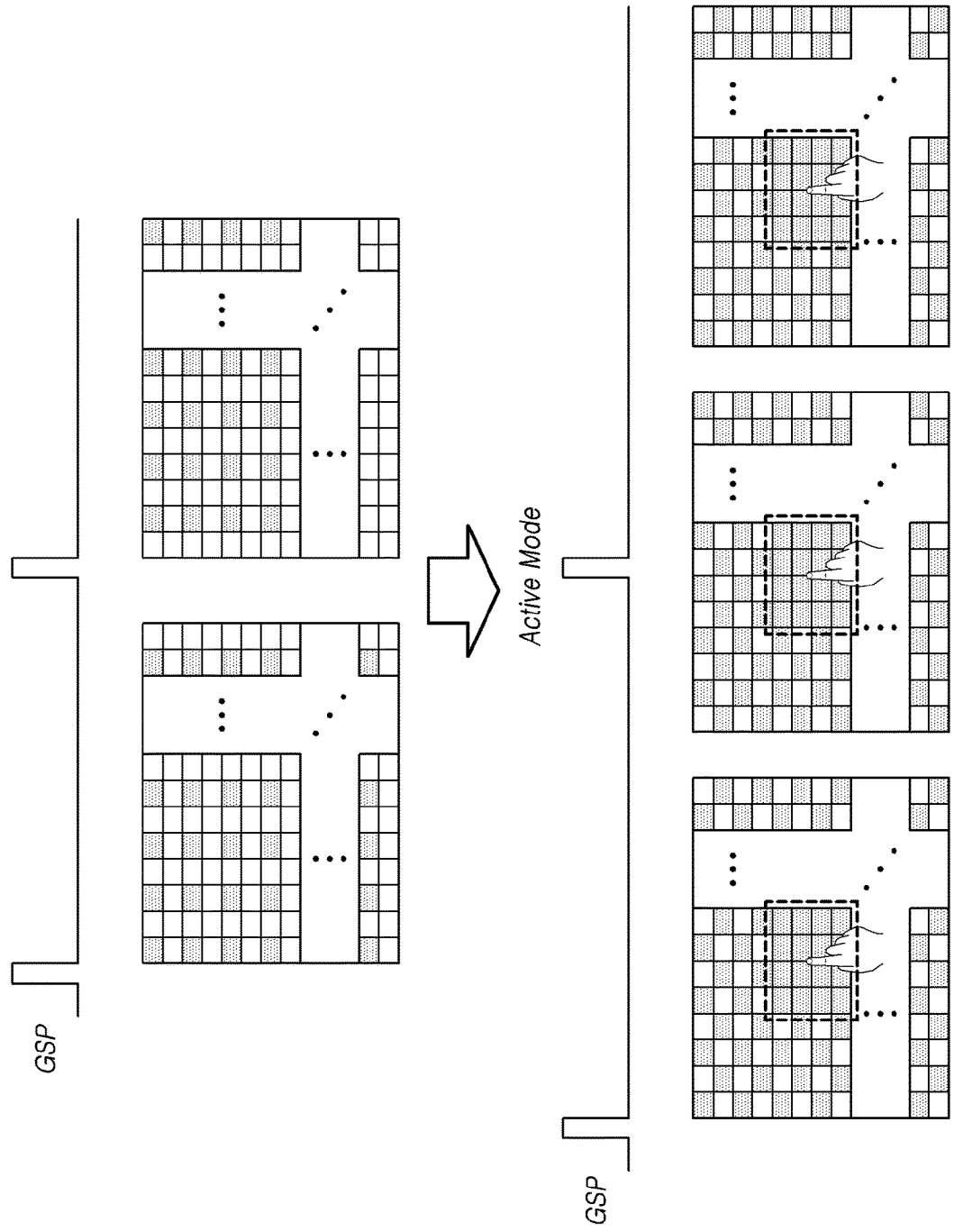
FIG. 21 is a process diagram illustrating a touch driving method according to a ninth embodiment of the present disclosure.
Figure 22:
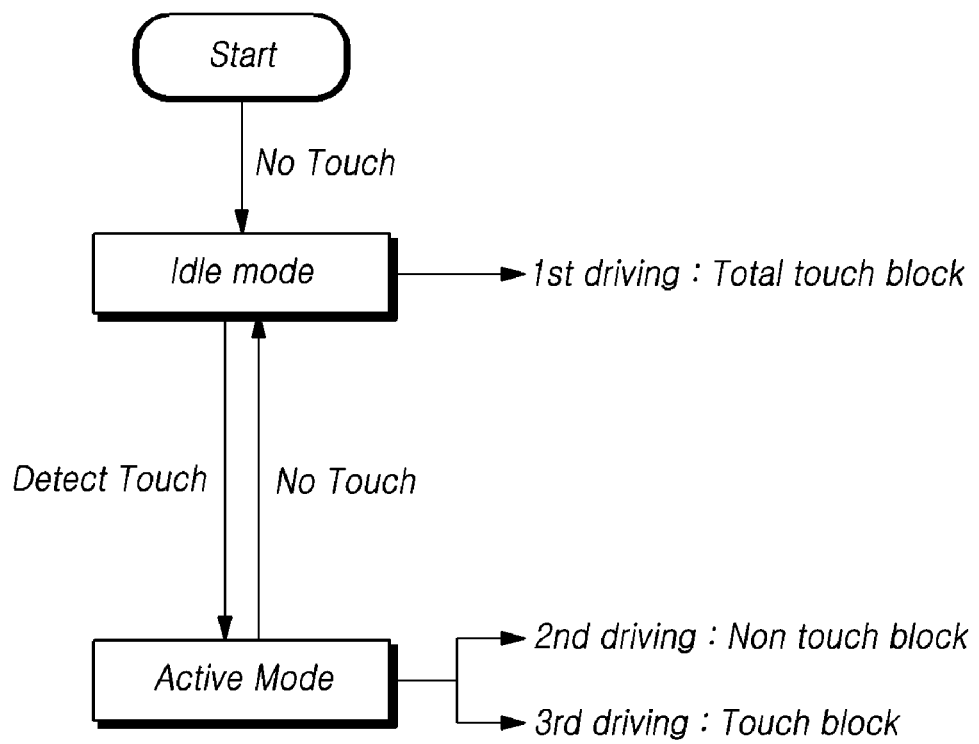
FIG. 22 is a flowchart illustrating the touch driving method according to the ninth embodiment.

FIG. 21 is a process diagram illustrating a touch driving method according to a ninth embodiment, while FIG. 22 is a flowchart illustrating the touch driving method according to the ninth embodiment.

Referring to FIGS. 21 and 22, the touch driving method according to the ninth embodiment can differently set the number of touch electrodes TEs sensed in the idle mode in which no touch is detected and the number of touch electrodes TEs sensed in the active mode in which a touch is detected in any touch block TB. Specifically, the number of the touch electrodes TEs sensed in the active mode is set to be greater than the number of touch electrodes TEs sensed in the idle mode.

For example, in the idle mode, the entirety of the touch electrodes TEs of the display panel DP are driven at a ¼ period so that 4 touch electrodes are sequentially sensed per frame.

In contrast, in the active mode in which a touch is detected in any touch block TB, the sensing ratio of the entirety of the touch electrodes TEs of the display panel DP is changed to be higher than the sensing ratio, i.e., the ¼ period, of the idle mode.

For example, in the active mode in which a touch is detected, all touch electrodes TEs in the touch sensing block TSB in which a touch is detected, are continuously sensed, and touch electrodes TEs in non-touch blocks in which no touch is detected are driven at a sensing ratio (e.g., a ½ period) higher than the sensing ratio (i.e., ¼ period) of the idle mode.

For example, when a touch is detected in any touch block TB (i.e., the touch sensing block TSB), it is highly probable that a touch block TB adjacent to the touch sensing block TSB or another touch block TB can also be touched. Thus, the sensing ratio of non-touch blocks is controlled to be higher than the sensing ratio in the idle mode.

In the active mode, it is more effective that the number of touch electrodes TEs sensed in the touch sensing block TSB in which a touch is detected is greater than the number of touch electrodes TEs sensed in another touch block TB. Accordingly, in the active mode, the touch electrodes TEs in the touch sensing block TSB are illustrated as being continuously sensed, and the remaining touch blocks TBs are illustrated as having a sensing ratio of the ½ period, which is higher than the sensing ratio in the idle mode.

As described above, in a case in which the numbers of touch electrodes TEs sensed in the touch block TB in the idle mode and the active mode are controlled in a stepwise manner, it is possible to maintain sensitivity in the touch sensing in the active mode in which a touch is detected while effectively reducing power consumption in the idle mode in which no touch is detected.

Although the touch driving method using the self-capacitance touch sensing of applying the touch driving signal TDS through a sensing line SL and receiving the touch sensing signal through the same sensing line SL has been described above as an example, the touch driving method according to the present disclosure can be applied to the mutual capacitance touch sensing in the same manner.

Figure 23:
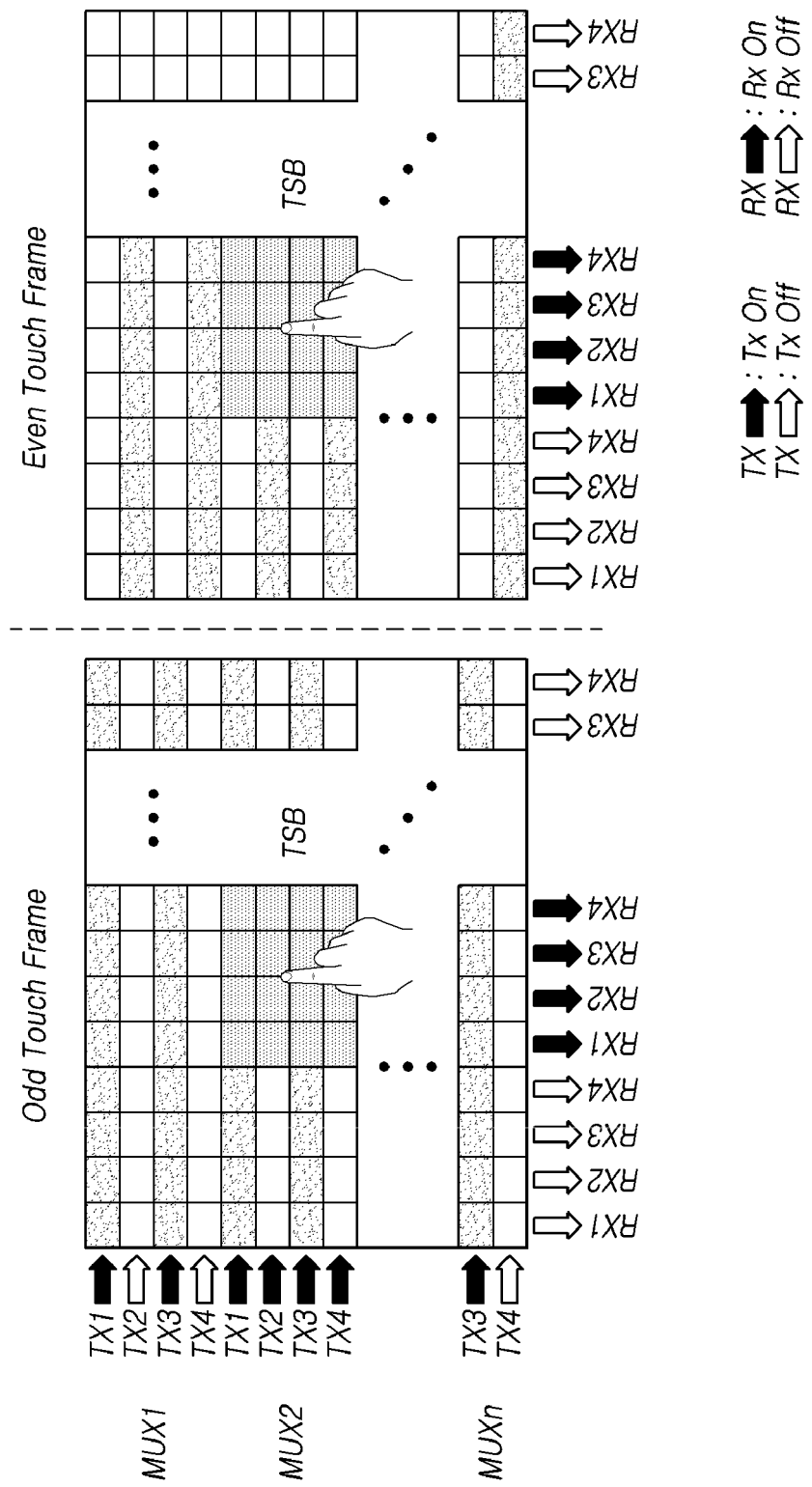
FIG. 23 is a diagram illustrating a case in which the touch driving method according to embodiments of the present disclosure is applied to the mutual capacitance touch sensing.

FIG. 23 is a diagram illustrating a case in which the touch driving method according to embodiments is applied to the mutual capacitance touch sensing.

Referring to FIG. 23, the touch driving method according to embodiments using the mutual capacitance touch sensing can apply a touch driving signal TDS to the touch electrodes TEs through driving lines Tx and receive touch sensing signals from the touch electrodes TE through sensing lines Rx.

When a touch is detected in any touch block TB (i.e., the touch sensing block TSB), the touch driving signal TDS can simultaneously be applied to the touch sensing block TSB in which a touch is detected through the driving lines Tx, and the touch sensing signals can simultaneously be received through the sensing lines Rx connected to the touch sensing block TSB.

In contrast, for non-touch blocks in which no touch is detected, the sensing ratio of the touch electrodes TEs can be reduced, thereby reducing power consumption, as described above.

The above description has been presented to enable those having ordinary knowledge in the art to make and use the technical idea of the present disclosure, and has been provided in the context of a particular application and its requirements. Various modifications, additions and substitutions to the described embodiments will be readily apparent to those having ordinary knowledge and the general principles defined herein can be applied to other embodiments and applications without departing from the spirit and scope of the present disclosure. The above description and the accompanying drawings provide an example of the technical idea of the present disclosure for illustrative purposes only. For example, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
   a display panel, wherein a touchscreen panel including a plurality of touch electrodes arranged in a matrix form is embedded in the display panel; and
   a touch circuit configured to sense the plurality of touch electrodes by grouping the plurality of touch electrodes into a plurality of touch blocks, and control a greater number of touch electrodes to be sensed in a touch sensing block in which a touch is detected, among the plurality of touch blocks, than in a non-touch block in which no touch is detected, among the plurality of touch blocks.

2. The touch display device according to claim 1, wherein the touch circuit applies a touch driving signal to the plurality of touch electrodes in the touch blocks, and determines a touch event and a touch position using touch sensing signals received from the plurality of touch electrodes.

3. The touch display device according to claim 2, wherein the touch circuit is configured so that driving lines, through which the touch driving signal is applied, are the same as or are separate from sensing lines, through which the touch sensing signals are received.

4. The touch display device according to claim 1, wherein all of the plurality of touch electrodes in the touch sensing block are continuously sensed.

5. The touch display device according to claim 1, wherein the plurality of touch electrodes in the non-touch block are sensed at a ½ period.

6. The touch display device according to claim 5, wherein the plurality of touch electrodes in the non-touch block are sensed so that odd touch electrodes and even touch electrodes are alternately sensed, or
   an odd row of touch electrodes and an even row of touch electrodes are alternately sensed, or
   an odd column of touch electrodes and an even column of touch electrodes are alternately sensed.

7. The touch display device according to claim 1, wherein the plurality of touch electrodes in the non-touch block are sensed at a ¼ period so that four adjacent touch electrodes thereof are sequentially sensed.

8. The touch display device according to claim 1, wherein the plurality of touch electrodes in the touch sensing block are sensed at a ½ period, and
   the plurality of touch electrodes in the non-touch block are sensed at a ¼ period so that four adjacent touch electrodes thereof are sequentially sensed.

9. The touch display device according to claim 1, wherein the sensing is controlled so that a greater number of the plurality of touch electrodes are sensed in the touch sensing block in an active mode of the display panel than in the touch sensing block in an idle mode of the display panel.

10. The touch display device according to claim 9, wherein, in the active mode, the number of first touch electrodes sensed in the touch sensing block, among the plurality of touch electrodes, is different from the number of second touch electrodes sensed in the non-touch block, among the plurality of touch electrodes,
    the number of first touch electrodes being greater than the number of second touch electrodes.

11. A touch driving method for a display panel, wherein a touchscreen panel including a plurality of touch electrodes arranged in a matrix form is embedded in the display panel, the touch driving method comprising:
    sensing the plurality of touch electrodes by grouping the plurality of touch electrodes into a plurality of touch blocks;
    determining a touch event in a touch block among the plurality of touch blocks; and
    if the touch event is present as a result of the determination, controlling the sensing so that a greater number of touch electrodes which are sensed in a touch block in which a touch is detected, among the plurality of touch blocks, than in a touch block in which no touch is detected, among the plurality of touch blocks.

* * * * *